United States Patent
Chen et al.

(10) Patent No.: US 11,012,285 B2
(45) Date of Patent: May 18, 2021

(54) METHODS, APPARATUS, SERVERS, AND SYSTEMS FOR VITAL SIGNS DETECTION AND MONITORING

(71) Applicants: Chen Chen, Burlingame, CA (US); Beibei Wang, Clarksville, MD (US); Yi Han, Ellicott City, MD (US); Feng Zhang, Greenbelt, MD (US); Hung-Quoc Duc Lai, Parkville, MD (US); Yan Chen, Chengdu (CN); K. J. Ray Liu, Potomac, MD (US); Oscar Chi-Lim Au, San Jose, CA (US)

(72) Inventors: Chen Chen, Burlingame, CA (US); Beibei Wang, Clarksville, MD (US); Yi Han, Ellicott City, MD (US); Feng Zhang, Greenbelt, MD (US); Hung-Quoc Duc Lai, Parkville, MD (US); Yan Chen, Chengdu (CN); K. J. Ray Liu, Potomac, MD (US); Oscar Chi-Lim Au, San Jose, CA (US)

(73) Assignee: ORIGIN WIRELESS, INC., Greenbelt, MD (US)

(*) Notice: Subject to any disclaimer, the term of this patent is extended or adjusted under 35 U.S.C. 154(b) by 141 days.

(21) Appl. No.: 16/127,151

(22) Filed: Sep. 10, 2018

(65) Prior Publication Data
US 2019/0007256 A1 Jan. 3, 2019

Related U.S. Application Data

(63) Continuation-in-part of application No. 15/326,112, filed as application No. PCT/US2015/041037 on Jul.
(Continued)

(51) Int. Cl.
H04L 27/36 (2006.01)
H04W 72/04 (2009.01)
(Continued)

(52) U.S. Cl.
CPC ............ *H04L 27/362* (2013.01); *H04B 1/38* (2013.01); *H04L 5/0048* (2013.01); *H04W 72/0413* (2013.01)

(58) Field of Classification Search
CPC ....... H04L 27/362; H04L 5/0048; H04B 1/38; H04W 72/0413
See application file for complete search history.

(56) References Cited

U.S. PATENT DOCUMENTS

| 2003/0163313 A1 | 8/2003 | Rees |
| 2006/0079782 A1 | 4/2006 | Beach et al. |

(Continued)

FOREIGN PATENT DOCUMENTS

WO 2010/134933 A1 11/2010

OTHER PUBLICATIONS

International Search Report of PCT/US2017/021963 dated Jun. 1, 2017 [PCT/ISA/210].
(Continued)

*Primary Examiner* — Alex Skripnikov
*Assistant Examiner* — Sharmin Chowdhury

(57) ABSTRACT

The present teaching relates to vital sign detection and monitoring based on channel state information (CSI). In one example, an apparatus for vital sign detection is disclosed. The apparatus comprises a receiver, a processor and a memory communicatively coupled with the processor. The receiver is configured for receiving at least one wireless signal from a multipath channel that can be impacted by a vital sign of at least one living being. The processor is configured for: extracting a time series of channel state information (CSI) for the multipath channel from the at least one wireless signal, obtaining one or more periodic fluctuations based on a spectral analysis of the time series of CSI,
(Continued)

and determining whether the vital sign is present based on the one or more periodic fluctuations.

20 Claims, 18 Drawing Sheets

Related U.S. Application Data 17, 2015, and a continuation-in-part of application No. 14/605,611, filed on Jan. 26, 2015, now Pat. No. 10,168,414, application No. 16/127,151, which is a continuation-in-part of application No. 15/584,052, filed on May 2, 2017, now Pat. No. 10,447,094, and a continuation-in-part of application No. 15/434,813, filed on Feb. 16, 2017, now Pat. No. 10,129,862, and a continuation-in-part of application No. PCT/US2017/021963, filed on Mar. 10, 2017, and a continuation-in-part of application No. PCT/US2017/021957, filed on Mar. 10, 2017, and a continuation-in-part of application No. PCT/US2017/027131, filed on Apr. 12, 2017, and a continuation-in-part of application No. 15/384,217, filed on Dec. 19, 2016, now Pat. No. 10,440,705, which is a continuation-in-part of application No. 13/706,342, filed on Dec. 5, 2012, now Pat. No. 9,883,511, and a continuation-in-part of application No. 13/969,271, filed on Aug. 16, 2013, now Pat. No. 9,882,675, and a continuation-in-part of application No. 13/969,320, filed on Aug. 16, 2013, now Pat. No. 9,559,874, and a continuation-in-part of application No. 15/041,677, filed on Feb. 11, 2016, now Pat. No. 9,794,156, and a continuation-in-part of application No. 15/200,430, filed on Jul. 1, 2016, now Pat. No. 9,736,002, which is a continuation of application No. 14/262,153, filed on Apr. 25, 2014, now Pat. No. 9,407,306, said application No. 15/384,217 is a continuation-in-part of application No. 15/200,429, filed on Jul. 1, 2016, now Pat. No. 9,781,700, which is a continuation of application No. 14/943,648, filed on Nov. 17, 2015, now Pat. No. 9,402,245, which is a continuation of application No. 14/202,651, filed on Mar. 10, 2014, now Pat. No. 9,226,304, said application No. 15/384,217 is a continuation-in-part of application No. 14/605,611, and a continuation-in-part of application No. 14/615,984, filed on Feb. 6, 2015, now Pat. No. 9,686,054, and a continuation-in-part of application No. 15/004,314, filed on Jan. 22, 2016, now Pat. No. 10,014,982, and a continuation-in-part of application No. 15/061,059, filed on Mar. 4, 2016, now Pat. No. 10,609,711, and a continuation-in-part of application No. PCT/US2015/041037, filed on Jul. 17, 2015, which is a continuation-in-part of application No. 14/605,611, said application No. 15/384,217 is a continuation-in-part of application No. 15/268,477, filed on Sep. 16, 2016, now Pat. No. 9,887,864, which is a continuation of application No. 15/200,429, and a continuation-in-part of application No. 15/200,429, which is a continuation of application No. 14/943,468, which is a continuation of application No. 14/202,651, said application No. 15/384,217 is a continuation-in-part of application No. 15/284,496, filed on Oct. 3, 2016, now Pat. No. 10,327,213, and a continuation-in-part of application No. PCT/US2016/066015, filed on Dec. 9, 2016, application No. 16/127,151, which is a continuation-in-part of application No. PCT/US2017/015909, filed on Jan. 31, 2017, which is a continuation-in-part of application No. PCT/US2016/066015, filed on Dec. 9, 2016, application No. 16/127,151, which is a continuation-in-part of application No. 15/861,422, filed on Jan. 3, 2018, and a continuation-in-part of application No. 15/873,806, filed on Jan. 17, 2018, now Pat. No. 10,270,642, and a continuation-in-part of application No. 16/101,444, filed on Aug. 11, 2018, now Pat. No. 10,291,460.

(60) Provisional application No. 62/148,019, filed on Apr. 15, 2015, provisional application No. 62/025,795, filed on Jul. 17, 2014, provisional application No. 62/069,090, filed on Oct. 27, 2014, provisional application No. 62/331,278, filed on May 3, 2016, provisional application No. 62/295,970, filed on Feb. 16, 2016, provisional application No. 62/320,965, filed on Apr. 11, 2016, provisional application No. 62/307,081, filed on Mar. 11, 2016, provisional application No. 62/316,850, filed on Apr. 1, 2016, provisional application No. 62/307,172, filed on Mar. 11, 2016, provisional application No. 62/334,110, filed on May 10, 2016, provisional application No. 62/322,575, filed on Apr. 14, 2016, provisional application No. 62/409,796, filed on Oct. 18, 2016, provisional application No. 62/557,117, filed on Sep. 11, 2017, provisional application No. 62/593,826, filed on Dec. 1, 2017, provisional application No. 62/106,395, filed on Jan. 22, 2015, provisional application No. 62/128,574, filed on Mar. 5, 2015, provisional application No. 62/219,315, filed on Sep. 16, 2015, provisional application No. 62/235,958, filed on Oct. 1, 2015, provisional application No. 62/265,155, filed on Dec. 9, 2015, provisional application No. 62/411,504, filed on Oct. 21, 2016, provisional application No. 62/383,235, filed on Sep. 2, 2016, provisional application No. 62/331,278, filed on May 3, 2016, provisional application No. 62/384,060, filed on Sep. 6, 2016, provisional application No. 62/678,207, filed on May 30, 2018.

(51) Int. Cl.
*H04B 1/38* (2015.01)
*H04L 5/00* (2006.01)

(56) References Cited

U.S. PATENT DOCUMENTS

| | | |
|---|---|---|
| 2010/0024509 A1 | 9/2010 | Singh et al. |
| 2010/0249630 A1 | 9/2010 | Droitcour et al. |
| 2010/0286522 A1* | 11/2010 | Beach ............... A61B 5/02007 600/441 |
| 2011/0309267 A1 | 12/2011 | Cui et al. |
| 2015/0036772 A1 | 2/2015 | Garrett et al. |
| 2015/0139002 A1* | 5/2015 | Lee ................. H04W 24/08 370/252 |
| 2016/0022145 A1 | 1/2016 | Mostov |
| 2017/0042432 A1* | 2/2017 | Adib ................. G01S 7/415 |
| 2017/0105659 A1* | 4/2017 | Kiaei ................ A61B 5/0507 |

OTHER PUBLICATIONS

Written Opinion of PCT/US2017/021963 dated Jun. 1, 2017 [PCT/ISA/237].

\* cited by examiner

METHODS, APPARATUS, SERVERS, AND SYSTEMS FOR VITAL SIGNS DETECTION AND MONITORING

CROSS-REFERENCE TO RELATED APPLICATIONS

The present application hereby claims priority to, and incorporates by reference the entirety of the disclosures of, each of the following applications:

(a) U.S. patent application Ser. No. 15/326,112, entitled "WIRELESS POSITIONING SYSTEMS", filed on Jan. 13, 2017,
 (1) which is a national stage entry of PCT patent application PCT/US2015/041037, entitled "WIRELESS POSITIONING SYSTEMS", filed on Jul. 17, 2015, published as WO 2016/011433A2 on Jan. 21, 2016,
  a. which claims priority to U.S. Provisional patent application 62/148,019, entitled "WIRELESS POSITIONING SYSTEMS", filed on Apr. 15, 2015,
  b. which is a continuation-in-part of U.S. patent application Ser. No. 14/605,611, entitled "WIRELESS POSITIONING SYSTEMS", filed on Jan. 26, 2015, published as US2016/0018508A1 on Jan. 21, 2016,
   1. which claims priority to U.S. Provisional patent application 62/025,795, entitled "TIME-REVERSAL POSITIONING SYSTEMS", filed on Jul. 17, 2014, and
   2. which claims priority to U.S. Provisional patent application 62/069,090, entitled "TIME-REVERSAL POSITIONING SYSTEMS", filed on Oct. 27, 2014,
(b) U.S. patent application Ser. No. 15/584,052, entitled "METHOD, SYSTEM, AND APPARATUS FOR WIRELESS POWER TRANSMISSION BASED ON POWER WAVEFORMING", filed on May 2, 2017,
 (1) which claims priority to U.S. Provisional patent application 62/331,278, entitled "USING VIRTUAL ANTENNAS FOR POWER WAVEFORMING IN WIRELESS POWER TRANSMISSION SYSTEMS", filed on May 3, 2016,
(c) U.S. patent application Ser. No. 15/434,813, entitled "METHODS, DEVICES, APPARATUS, AND SYSTEMS FOR MEDIUM ACCESS CONTROL IN WIRELESS COMMUNICATION SYSTEMS UTILIZING SPATIAL FOCUSING EFFECT", filed on Feb. 16, 2017,
 (1) which claims priority to U.S. Provisional patent application 62/295,970, entitled "THE IMPACT OF SPATIAL FOCUSING EFFECTS ON MEDIUM ACCESS CONTROL DESIGN FOR 5G", filed on Feb. 16, 2016,
 (2) which claims priority to U.S. Provisional patent application 62/320,965, entitled "OPTIMAL RATE ADAPTATION FOR THROUGHPUT MAXIMIZATION IN TIME REVERSAL DIVISION MULTIPLE ACCESS", filed on Apr. 11, 2016,
(d) PCT patent application PCT/US2017/021963, entitled "METHODS, APPARATUS, SERVERS, AND SYSTEMS FOR VITAL SIGNS DETECTION AND MONITORING", filed on Mar. 10, 2017, published as WO2017/156492A1 on Sep. 14, 2017,
 (1) which claims priority to U.S. Provisional patent application 62/307,081, entitled "TR-BREATH: TIME-REVERSAL BREATHING RATE ESTIMATION AND DETECTION", filed on Mar. 11, 2016,
 (2) which claims priority to U.S. Provisional patent application 62/316,850, entitled "TR-BREATH: TIME-REVERSAL BREATHING RATE ESTIMATION AND DETECTION", filed on Apr. 1, 2016,
(e) PCT patent application PCT/US2017/021957, entitled "METHODS, APPARATUS, SERVERS, AND SYSTEMS FOR HUMAN IDENTIFICATION BASED ON HUMAN RADIO BIOMETRIC INFORMATION", filed on Mar. 10, 2017, published as WO2017/156487A1 on Sep. 14, 2017,
 (1) which claims priority to U.S. Provisional patent application 62/307,172, entitled "RADIO SHOT: THROUGH-THE-WALL HUMAN IDENTIFICATION", filed on Mar. 11, 2016,
 (2) which claims priority to U.S. Provisional patent application 62/334,110, entitled "TIME-REVERSAL TRACKING WITHOUT MAPPING", filed on May 10, 2016,
(f) PCT patent application PCT/US2017/027131, entitled "METHODS, APPARATUS, SERVERS, AND SYSTEMS FOR OBJECT TRACKING", filed on Apr. 12, 2017, published as WO2017/180698A1 on Oct. 19, 2017,
 (1) which claims priority to U.S. Provisional patent application 62/322,575, entitled "TIME-REVERSAL RESONATING EFFECT AND ITS APPLICATION IN WALKING SPEED ESTIMATION", filed on Apr. 14, 2016,
 (2) which claims priority to U.S. Provisional patent application 62/334,110, entitled "TIME-REVERSAL TRACKING WITHOUT MAPPING", filed on May 10, 2016, and
 (3) which claims priority to U.S. Provisional patent application 62/409,796, entitled "METHODS, DEVICES, SERVERS, AND SYSTEMS OF TIME REVERSAL BASED TRACKING", filed on Oct. 18, 2016,
(g) U.S. Provisional patent application 62/557,117, entitled "METHODS, DEVICES, SERVERS, APPARATUS, AND SYSTEMS FOR WIRELESS INTERNET OF THINGS APPLICATIONS", filed on Sep. 11, 2017,
(h) U.S. Provisional patent application 62/593,826, entitled "METHOD, APPARATUS, AND SYSTEM FOR OBJECT TRACKING AND NAVIGATION", filed on Dec. 1, 2017,
(i) U.S. patent application Ser. No. 15/384,217, entitled "METHOD, APPARATUS, SERVER, AND SYSTEMS OF TIME-REVERSAL TECHNOLOGY", filed on Dec. 19, 2016, published as US2017/0188359A1 on Jun. 29, 2017,
 (1) which is a Continuation-in-Part of U.S. patent application Ser. No. 13/706,342, entitled "WAVEFORM DESIGN FOR TIME-REVERSAL SYSTEMS," filed on Dec. 5, 2012, issued as U.S. Pat. No. 9,883,511 on Jan. 30, 2018,
 (2) which is a Continuation-in-Part of U.S. patent application Ser. No. 13/969,271, entitled "TIME-REVERSAL WIRELESS SYSTEMS HAVING ASYMMETRIC ARCHITECTURE", filed on Aug. 16, 2013, published as US2015/0049745A1 on Feb. 19, 2015, issued as U.S. Pat. No. 9,882,675 on Jan. 30, 2018,
 (3) which is a Continuation-in-Part of U.S. patent application Ser. No. 13/969,320, entitled "MULTIUSER TIME-REVERSAL DIVISION MULTIPLE ACCESS UPLINK SYSTEM WITH PARALLEL INTERFERENCE CANCELLATION", filed on Aug. 16, 2013, issued as U.S. Pat. No. 9,559,874 on Jan. 31, 2017,
 (4) which is a Continuation-in-Part of U.S. patent application Ser. No. 15/041,677, entitled "HANDSHAKING PROTOCOL FOR TIME-REVERSAL SYSTEM", filed on Feb. 11, 2016, published as US2016/

0164669A1 on Jun. 9, 2016, issued as U.S. Pat. No. 9,794,156 on Oct. 17, 2017, (5) which is a Continuation-in-Part of U.S. patent application Ser. No. 15/200,430, entitled "QUADRATURE AMPLITUDE MODULATION FOR TIME-REVERSAL SYSTEMS", filed on Jul. 1, 2016, published as US2016/0315797A1 on Oct. 27, 2016, issued as U.S. Pat. No. 9,736,002 on Aug. 15, 2017, a. which is a Continuation of U.S. patent application Ser. No. 14/262,153, entitled "QUADRATURE AMPLITUDE MODULATION FOR TIME-REVERSAL SYSTEMS", filed on Apr. 25, 2014, issued as U.S. Pat. No. 9,407,306 on Aug. 2, 2016, (6) which is a Continuation-in-Part of U.S. patent application Ser. No. 15/200,429, entitled "TIME-REVERSAL WIRELESS PARADIGM FOR INTERNET OF THINGS", filed on Jul. 1, 2016, issued as U.S. Pat. No. 9,781,700 on Oct. 3, 2017, a. which is a Continuation of U.S. patent application Ser. No. 14/943,648, entitled "TIME-REVERSAL WIRELESS PARADIGM FOR INTERNET OF THINGS", filed on Nov. 17, 2015, issued as U.S. Pat. No. 9,402,245 on Jul. 26, 2016, 1. which is a Continuation of U.S. patent application Ser. No. 14/202,651, entitled "TIME-REVERSAL WIRELESS PARADIGM FOR INTERNET OF THINGS", filed on Mar. 10, 2014, issued as U.S. Pat. No. 9,226,304 on Dec. 29, 2015, (7) which is a Continuation-in-Part of U.S. patent application Ser. No. 14/605,611, entitled "WIRELESS POSITIONING SYSTEM", filed on Jan. 26, 2015, published as US2016/0018508A1 on Jan. 21, 2016, a. which claims priority to U.S. Provisional patent application 62/069,090, entitled "TIME-REVERSAL POSITIONING SYSTEMS", filed on Oct. 27, 2014, b. which claims priority to U.S. Provisional patent application 62/025,795, entitled "TIME-REVERSAL POSITIONING SYSTEMS", filed on Jul. 17, 2014, (8) which is a Continuation-in-Part of U.S. patent application Ser. No. 14/615,984, entitled "JOINT WAVEFORM DESIGN AND INTERFERENCE PRE-CANCELLATION FOR TIME-REVERSAL SYSTEMS", filed on Feb. 6, 2015, issued as U.S. Pat. No. 9,686,054 on Jun. 20, 2017, a. which claims priority to U.S. Provisional patent application 62/025,795, entitled "TIME-REVERSAL POSITIONING SYSTEMS", filed on Jul. 17, 2014, (9) which is a Continuation-in-Part of U.S. patent application Ser. No. 15/004,314, entitled "TIME-REVERSAL TECHNOLOGIES FOR HYBRID WIRELESS NETWORKS", filed on Jan. 22, 2016, issued as U.S. Pat. No. 10,014,982 on Jul. 3, 2018, a. which claims priority to U.S. Provisional patent application 62/106,395, entitled "TIME-REVERSAL TECHNOLOGIES FOR HYBRID WIRELESS NETWORKS", filed on Jan. 22, 2015,

(10) which is a Continuation-in-Part of U.S. patent application Ser. No. 15/061,059, entitled "TIME-REVERSAL SCALABILITY FOR HIGH NETWORK DENSIFICATION", filed on Mar. 4, 2016, a. which claims priority to U.S. Provisional patent application 62/128,574, entitled "TIME-REVERSAL SCALABILITY FOR HIGH NETWORK DENSIFICATION", filed on Mar. 5, 2015,

(11) which is a Continuation-in-Part of PCT patent application PCT/US2015/041037, entitled "WIRELESS POSITIONING SYSTEMS", filed on Jul. 17, 2015, published as WO2016/011433A2 on Jan. 21, 2016, a. which claims priority to U.S. Provisional patent application 62/148,019, entitled "WIRELESS POSITIONING SYSTEMS", filed on Apr. 15, 2015, b. which is a continuation-in-part of U.S. patent application Ser. No. 14/605,611, entitled "WIRELESS POSITIONING SYSTEMS", filed on Jan. 26, 2015, published as US2016/0018508A1 on Jan. 21, 2016, 1. which claims priority to U.S. Provisional patent application 62/025,795 entitled "TIME-REVERSAL POSITIONING SYSTEMS", filed on Jul. 17, 2014, and 2. which claims priority to U.S. Provisional patent application 62/069,090 entitled "TIME-REVERSAL POSITIONING SYSTEMS", filed on Oct. 27, 2014,

(12) which is a Continuation-in-Part of U.S. patent application Ser. No. 15/268,477, entitled "METHODS, DEVICES AND SYSTEMS OF HETEROGENEOUS TIME-REVERSAL PARADIGM ENABLING DIRECT CONNECTIVITY IN INTERNET OF THINGS", filed on Sep. 16, 2016, issued as U.S. Pat. No. 9,887,864 on Feb. 6, 2018, a. which claims priority to U.S. Provisional patent application 62/219,315, entitled "ENABLING DIRECT CONNECTIVITY IN INTERNET OF THINGS: A HETEROGENEOUS TIME-REVERSAL PARADIGM", filed on Sep. 16, 2015, b. which is a Continuation-in-part of U.S. patent application Ser. No. 15/200,429, entitled "TIME-REVERSAL WIRELESS PARADIGM FOR INTERNET OF THINGS", filed on Jul. 1, 2016, issued as U.S. Pat. No. 9,781,700 on Oct. 3, 2017, 1. which is a Continuation of U.S. patent application Ser. No. 14/943,648, entitled "TIME-REVERSAL WIRELESS PARADIGM FOR INTERNET OF THINGS", filed on Nov. 17, 2015, issued as U.S. Pat. No. 9,402,245 on Jul. 26, 2016, i. which is a Continuation of U.S. patent application Ser. No. 14/202,651, entitled "TIME-REVERSAL WIRELESS PARADIGM FOR INTERNET OF THINGS", filed on Mar. 10, 2014, issued as U.S. Pat. No. 9,226,304 on Dec. 29, 2015,

(13) which is a Continuation-in-Part of U.S. patent application Ser. No. 15/284,496, entitled "TIME-REVERSAL COMMUNICATION SYSTEMS", filed on Oct. 3, 2016, a. which claims priority to U.S. Provisional patent application 62/235,958, entitled "SYMBOL TIMING FOR TIME-REVERSAL SYSTEMS WITH SIGNATURE DESIGN", filed on Oct. 1, 2015,

(14) which is a Continuation-in-Part of PCT patent application PCT/US2016/066015, entitled "METHOD, APPARATUS, AND SYSTEMS FOR WIRELESS EVENT DETECTION AND MONITORING", filed on Dec. 9, 2016, published as WO2017/100706A1 on Jun. 15, 2017, whose US national stage entry is Ser. No. 16/060,710, filed on Jun. 8, 2018, a. which claims priority to U.S. Provisional patent application 62/265,155, entitled "INDOOR EVENTS DETECTION SYSTEM", filed on Dec. 9, 2015, b. which claims priority to U.S. Provisional patent application 62/411,504, entitled "METHOD, APPARATUS, AND SYSTEM FOR WIRELESS INTERNET OF THINGS APPLICATIONS", filed on Oct. 21, 2016,
c. which claims priority to U.S. Provisional patent application 62/383,235, entitled "TIME REVERSAL MONITORING SYSTEM", filed on Sep. 2, 2016,
d. which claims priority to U.S. Provisional patent application 62/307,081, entitled "TR-BREATH: TIME-REVERSAL BREATHING RATE ESTIMATION AND DETECTION", filed on Mar. 11, 2016,
e. which claims priority to U.S. Provisional patent application 62/316,850, entitled "TR-BREATH: TIME-REVERSAL BREATHING RATE ESTIMATION AND DETECTION", filed on Apr. 1, 2016,
(15) which claims priority to U.S. Provisional patent application 62/331,278, entitled "USING VIRTUAL ANTENNAS FOR POWER WAVEFORMING IN WIRELESS POWER TRANSMISSION SYSTEMS", filed on May 3, 2016,
(16) which claims priority to U.S. Provisional patent application 62/295,970, entitled "THE IMPACT OF SPATIAL FOCUSING EFFECTS ON THE MEDIUM ACCESS CONTROL DESIGN FOR 5G", filed on Feb. 16, 2016,
(17) which claims priority to U.S. Provisional patent application 62/320,965, entitled "OPTIMAL RATE ADAPTATION FOR THROUGHPUT MAXIMIZATION IN TIME REVERSAL DIVISION MULTIPLE ACCESS", filed on Apr. 11, 2016,
(18) which claims priority to U.S. Provisional patent application 62/307,081, entitled "TR-BREATH: TIME-REVERSAL BREATHING RATE ESTIMATION AND DETECTION", filed on Mar. 11, 2016,
(19) which claims priority to U.S. Provisional patent application 62/316,850, entitled "TR-BREATH: TIME-REVERSAL BREATHING RATE ESTIMATION AND DETECTION", filed on Apr. 1, 2016,
(20) which claims priority to U.S. Provisional patent application 62/307,172, entitled "RADIO SHOT: THROUGH-THE-WALL HUMAN IDENTIFICATION", filed on Mar. 11, 2016,
(21) which claims priority to U.S. Provisional patent application 62/322,575, entitled "TIME-REVERSAL RESONATING EFFECT AND ITS APPLICATION IN WALKING SPEED ESTIMATION", filed on Apr. 14, 2016,
(22) which claims priority to U.S. Provisional patent application 62/334,110, entitled "TIME-REVERSAL TRACKING WITHOUT MAPPING", filed on May 10, 2016,
(23) which claims priority to U.S. Provisional patent application 62/409,796, entitled "METHODS, DEVICES, SERVERS, AND SYSTEMS OF TIME REVERSAL BASED TRACKING", filed on Oct. 18, 2016,
(24) which claims priority to U.S. Provisional patent application 62/383,235, entitled "TIME REVERSAL MONITORING SYSTEM", filed on Sep. 2, 2016,
(25) which claims priority to U.S. Provisional patent application 62/384,060, entitled "METHODS, DEVICES, SERVERS, SYSTEMS OF TIME REVERSAL MACHINE PLATFORM FOR BROADBAND WIRELESS APPLICATIONS", filed on Sep. 6, 2016,
(26) which claims priority to U.S. Provisional patent application 62/411,504, entitled "METHOD, APPARATUS, AND SYSTEM FOR WIRELESS INTERNET OF THINGS APPLICATIONS", filed on Oct. 21, 2016,
(j) PCT patent application PCT/US2017/015909, entitled "METHODS, DEVICES, SERVERS, APPARATUS, AND SYSTEMS FOR WIRELESS INTERNET OF THINGS APPLICATIONS", filed on Jan. 31, 2017, published as WO2017/155634A1 on Sep. 14, 2017,
  (1) which claims priority to U.S. Provisional patent application 62/384,060, entitled "METHODS, DEVICES, SERVERS, SYSTEMS OF TIME REVERSAL MACHINE PLATFORM FOR BROADBAND WIRELESS APPLICATIONS", filed on Sep. 6, 2016,
  (2) which claims priority to U.S. Provisional patent application 62/331,278, entitled "USING VERTUAL ANTENNAS FOR POWER WAVEFORMING IN WIRELESS POWER TRANSMISSION SYSTEMS", filed on May 3, 2016,
  (3) which claims priority to U.S. Provisional patent application 62/307,081, entitled "TR-BREATH: TIME-REVERSAL BREATHING RATE ESTIMATION AND DETECTION", filed on Mar. 11, 2016,
  (4) which claims priority to U.S. Provisional patent application 62/316,850, entitled "TR-BREATH: TIME-REVERSAL BREATHING RATE ESTIMATION AND DETECTION", filed on Apr. 1, 2016,
  (5) which claims priority to U.S. Provisional patent application 62/322,575, entitled "TIME-REVERSAL RESONATING EFFECT AND ITS APPLICATION IN WALKING SPEED ESTIMATION", filed on Apr. 14, 2016,
  (6) which claims priority to U.S. Provisional patent application 62/334,110, entitled "TIME-REVERSAL TRACKING WITHOUT MAPPING", filed on May 10, 2016,
  (7) which claims priority to U.S. Provisional patent application 62/409,796, entitled "METHODS, DEVICES, SERVERS, AND SYSTEMS OF TIME REVERSAL BASED TRACKING", filed on Oct. 18, 2016,
  (8) which claims priority to U.S. Provisional patent application 62/383,235, entitled "TIME REVERSAL MONITORING SYSTEM", filed on Sep. 2, 2016,
  (9) which claims priority to U.S. Provisional patent application 62/411,504, entitled "METHOD, APPARATUS, AND SYSTEM FOR WIRELESS INTERNET OF THINGS APPLICATIONS", filed on Oct. 21, 2016,
  (10) which claims priority to U.S. Provisional patent application 62/307,172, entitled "RADIO SHOT: THROUGH-THE-WALL HUMAN IDENTIFICATION", filed on Mar. 11, 2016,
  (11) which is a Continuation-in-Part of PCT patent application PCT/US2016/066015, entitled "METHOD, APPARATUS, AND SYSTEMS FOR WIRELESS EVENT DETECTION AND MONITORING", filed on Dec. 9, 2016, published as WO2017/100706A1 on Jun. 15, 2017, whose US national stage entry is Ser. No. 16/060,710, filed on Jun. 8, 2018,
(k) U.S. Provisional patent application 62/678,207, entitled "METHOD, APPARATUS, AND SYSTEM FOR OBJECT TRACKING AND MOTION MONITORING", filed on May 30, 2018,
(l) U.S. patent application Ser. No. 15/861,422, entitled "METHOD, APPARATUS, SERVER, AND SYSTEMS OF TIME-REVERSAL TECHNOLOGY", filed on Jan. 3, 2018.

(m) U.S. patent application Ser. No. 15/873,806, entitled "METHOD, APPARATUS, AND SYSTEM FOR OBJECT TRACKING AND NAVIGATION", filed on Jan. 17, 2018.
(n) U.S. patent application Ser. No. 16/101,444, entitled "METHOD, APPARATUS, AND SYSTEM FOR WIRELESS MOTION MONITORING", filed on Aug. 11, 2018.

TECHNICAL FIELD

The present teaching generally relates to vital sign detection and monitoring. More specifically, the present teaching relates to vital sign detection and monitoring based on channel state information of wireless channels.

BACKGROUND

Vital signs are important indicators of a person's health and wellbeing as well as predictors of acute medical conditions and chronic disease states for a person. Breathing rate is one of the most important vital signs, which can be measured by the number of exhalation and inhalation a person takes per minute. In addition, the breathing pattern may highly correlate to psychological conditions of a human being, such as stress and anxiety.

Most traditional approaches for breathing monitoring are invasive in that they need physical contact of the human bodies. For instance, in hospitals, the patients are required to wear oxygen masks, Nasal cannulas, chest straps, or wearable sensors such as thermistors and pressure sensors. Another example is Polysomnography (PSG) used in sleep medicine, which typically requires a minimum of 22 wire attachments to the patient. These dedicated devices are often costly and bulky, create discomfort to the human bodies, and are limited only to clinical settings.

Currently existing non-invasive (contact-free) breathing monitoring solutions can be categorized as below.

(1) Radar-based breathing monitoring: Doppler radars are often used in breathing monitoring. They are operated by transmitting a signal and receiving a signal with a Doppler shift due to a periodic motion of objects. The breathing rates can be extracted from the Doppler shift. As a drawback, these systems use high transmission power, rely on sophisticated and expensive hardware, and use extremely large bandwidths. A vital sign monitoring system was disclosed utilizing frequency modulated continuous radar (FMCW). It used Universal Software Radio Peripheral (USRP) as the RF front-end to transmit a frequency-sweeping signal. But the additional cost and complexity of the dedicated hardware limited a large-scale deployment of FMCW radar.

(2) Wireless-sensor based breathing monitoring: The received signal strength (RSS) measurements from 802.15.4 compliant sensors on multiple 802.15.4 channels were also used for breathing detection and breathing rate estimation. Dense deployment of wireless sensors is required in these methods as additional wireless infrastructures. In addition, the specific design of frequency-hopping mechanism is required to support multiple channel measurements.

(3) Wi-Fi-based breathing monitoring: RSS is commonly used in the Wi-Fi-based breathing monitoring due to its availability on most commercial Wi-Fi network interface controllers (NICs). Measurements were also used with Wi-Fi devices for breathing estimation. Yet, this method is accurate only when the users hold the Wi-Fi-enabled devices in close proximity to their chests.

In addition to the drawbacks mentioned above, methods (1) and (2) require design and manufacturing of special devices such as specialized radar devices or sensor network nodes; while method (3) has very low accuracy and sensitivity.

Therefore, there is a need for methods and apparatus for vital sign detection and monitoring to solve the above-mentioned problems and to avoid the above-mentioned drawbacks.

SUMMARY

The present teaching generally relates to vital sign detection and monitoring. More specifically, the present teaching relates to vital sign detection and monitoring based on channel state information of wireless channels.

In one example, an apparatus for vital sign detection is disclosed. The apparatus comprises a receiver, a processor and a memory communicatively coupled with the processor. The receiver is configured for receiving at least one wireless signal from a multipath channel that can be impacted by a vital sign of at least one living being. The processor is configured for: extracting a time series of channel state information (CSI) for the multipath channel from the at least one wireless signal, obtaining one or more periodic fluctuations based on a spectral analysis of the time series of CSI, and determining whether the vital sign is present based on the one or more periodic fluctuations.

In another example, an apparatus for vital sign detection is disclosed. The apparatus comprises a plurality of receivers, a processor and a memory communicatively coupled with the processor. Each of the plurality of receivers is configured for receiving at least one wireless signal from a multipath channel that can be impacted by a vital sign of at least one living being. The processor is configured for: extracting, regarding each of the plurality of receivers, a time series of CSI for the multipath channel from the at least one wireless signal, obtaining, from each of the plurality of receivers, one or more periodic fluctuations based on a spectral analysis of the time series of CSI, determining, with respect to each of the plurality of receivers, one or more vital sign candidates based on the one or more periodic fluctuations, combining the vital sign candidates obtained from the plurality of receivers to generate a set of vital sign candidates, and determining whether the vital sign is present based on the one or more periodic fluctuations.

In yet another example, an apparatus for breathing rate estimation is disclosed. The apparatus comprises a plurality of receivers, a processor and a memory communicatively coupled with the processor. Each of the plurality of receivers is configured for receiving at least one wireless signal from a multipath channel that can be impacted by breathing of at least one living being. The processor is configured for: extracting, regarding each of the plurality of receivers, a time series of CSI for the multipath channel from the at least one wireless signal, obtaining, from each of the plurality of receivers, one or more periodic fluctuations based on a spectral analysis of the time series of CSI, determining, with respect to each of the plurality of receivers, one or more breathing rate candidates based on the one or more periodic fluctuations, combining the breathing rate candidates obtained from the plurality of receivers to generate a set of breathing rate candidates, partitioning the breathing rate candidates into a plurality of clusters each with an associated likelihood that indicates a possibility for that cluster to represent a breathing rate, merging two clusters in the plurality of clusters into one cluster when a centroid distance between the two clusters is less than a threshold, recalculating an estimated breathing rate and its associated likelihood for each merged cluster, and determining one or more breathing rates of one or more living beings based on one or more clusters having the highest associated likelihoods among the clusters after merging.

In one embodiment, at least one CSI is missing in the time series of CSI. In another embodiment, the processor is further configured for projecting at least one CSI in the time series of CSI into two or more distinct path delays of the multipath channel. In yet another embodiment, the processor is further configured for extracting at least one of high-order harmonics of the one or more periodic fluctuations based on the spectral analysis of the time series of CSI, wherein the one or more vital sign candidates are determined based on the at least one of the high-order harmonics.

In still another example, a method for vital sign detection is disclosed. The method may be implemented on a machine including at least a receiver, a processor and a memory communicatively coupled with the processor for vital sign detection. The method may comprise: receiving at least one wireless signal from a multipath channel that can be impacted by a vital sign of at least one living being; extracting a time series of CSI for the multipath channel from the at least one wireless signal; obtaining one or more periodic fluctuations based on a spectral analysis of the time series of CSI; and determining presence or absence of the vital sign based on the one or more periodic fluctuations.

Other examples in the present teaching include systems, methods, medium, devices, servers, and other implementations directed to vital sign detection and monitoring based on channel state information. For example, a system or server may include the above mentioned apparatus, or have a similar structure as the above mentioned apparatus for vital sign detection and monitoring based on channel state information.

Other concepts relate to software for implementing the present teaching on exploring computation, storage, application, and processing of vital sign detection and monitoring based on channel state information. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

DETAILED DESCRIPTION

Figure 1:
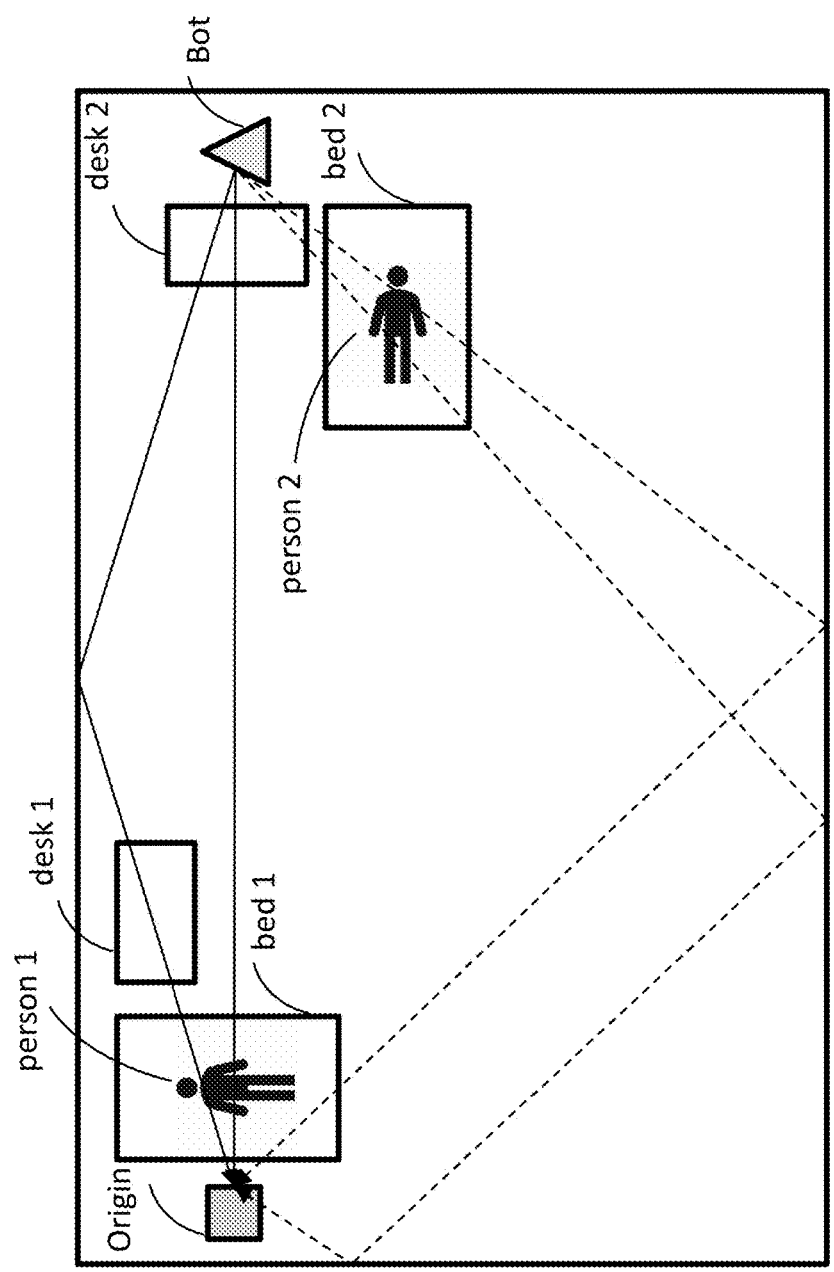
FIG. 1 shows an exemplary application of a disclosed breathing monitoring system, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching discloses a breathing rate monitoring system that can be used to a) measure breathing rates of a person, who is possibly moving, b) measure breathing strength of people, and c) estimate the number of people in a particular enclosure.

The disclosed breathing rate monitoring system is based on off-the-shelf Wi-Fi NICs, which are easily and cheaply available. Therefore, it can be deployed, managed and maintained easily and can be obtained at low cost. The disclosed system may work in both line-of-sight (LOS) and non-line-of-sight (NLOS) propagation conditions, and possibly for through-the-wall detection as well. A LOS environment means there is a direct LOS path between the device (transmitter or receiver) and a potential subject (human being or animal) to be detected or whose breathing rate is to be tested. In contrast, in a NLOS environment, there are some blockages, e.g. walls, between the device and the test subject, such that no light can directly pass through the straight path between the device and the potential subject.

The disclosed method implemented on the disclosed system in the present teaching does not require a physical proximity of the users of the system and the wireless transceivers, e.g. Wi-Fi devices. Moreover, the disclosed method can offer a contact-free solution, thus allowing for in-home and long-term health monitoring.

In one embodiment, the disclosed breathing rate monitoring system may comprise a receiver, a processor and a memory communicatively coupled with the processor. The receiver is configured for receiving at least one wireless signal from a multipath channel that can be impacted by a vital sign of at least one living being. The processor is configured for: extracting a time series of CSI for the multipath channel from the at least one wireless signal, obtaining one or more periodic fluctuations based on a spectral analysis of the time series of CSI, and determining presence or absence of the vital sign based on the one or more periodic fluctuations.

In one embodiment, the vital sign is represented by at least one of: breathing and heartbeat; and the at least one living being includes at least one of: a human being and an animal. In another embodiment, the vital sign is breathing and the processor is further configured for determining one or more breathing rates of one or more living beings, upon determining presence of the vital sign. The processor may be further configured for: cleaning each of the time series of CSI by subtracting background information from the CSI; normalizing each of the time series of CSI; and calculating a degree of similarity based on each pair of CSIs among the time series of CSI, wherein the spectral analysis is performed based on the calculated degrees of similarity. The degree of similarity may be calculated based on at least one of: a time-reversal resonance strength (TRRS), a cross-correlation, an inner product of two vectors, a similarity score, a distance score, a phase correction, a timing correction, a timing compensation, and a phase offset compensation, of a pair of CSIs.

In one embodiment, the processor is further configured for: calculating a TRRS matrix based on the time series of CSI; smoothing the TRRS matrix in time domain to generate a smoothed TRRS matrix, wherein the spectral analysis is performed based on the smoothed TRRS matrix. The processor may also be configured for: performing an eigenvalue decomposition on the TRRS matrix; obtaining a noise subspace based on the eigenvalue decomposition; generating a pseudo-spectrum based on the noise subspace; performing spectrum folding on the pseudo-spectrum to generated an updated pseudo-spectrum; trimming the updated pseudo-spectrum into a range related to breathing rate; and detecting one or more peaks of the updated pseudo-spectrum within the range, wherein the one or more breathing rates of one or more living beings are determined based on the detected one or more peaks. The processor may further be configured for: performing an eigenvalue decomposition on the TRRS matrix; obtaining a noise subspace based on the eigenvalue decomposition; obtaining a matrix based on the noise subspace; generating a polynomial equation based on the obtained matrix; and selecting one or more complex roots of the polynomial equation, wherein the one or more breathing rates of one or more living beings are determined based on information related to at least one of angle and phase of the one or more complex roots.

In one example, the spectral analysis may be performed based on at least one of: a MUSIC based algorithm and a Root-MUSIC based algorithm. In another example, at least one of the one or more living beings is moving. In yet another example, at least one of the one or more living beings is not within a line-of-sight of the receiver, such that no light can directly pass through a straight path between the at least one living being and the receiver.

In one embodiment, determining the one or more breathing rates of one or more living beings may comprise: determining breathing rate estimations based on the spectral analysis of the time series of CSI; partitioning the breathing rate estimations into a plurality of clusters each with an associated likelihood which indicates a possibility for that cluster to represent a breathing rate; merging two clusters in the plurality of clusters into one cluster when a centroid distance between the two clusters is less than a threshold; recalculating the breathing rate estimation and its associated likelihood for each merged cluster; and determining the one or more breathing rates based on one or more clusters having the highest associated likelihoods among the clusters.

The processor may be further configured for estimating a quantity of the one or more living beings based on the number of clusters after merging, or monitoring the continuous one or more breathing rates of the one or more living beings as they perform at least one of doing exercises, working, sleeping, eating, drinking, standing, sitting, walking, running, and any other activities.

In one embodiment, the at least one wireless signal is received through a network that is at least one of: Internet, an Internet-protocol network, and another multiple access network; and the receiver is associated with a physical layer of at least one of: a wireless PAN, IEEE 802.15.1 (Bluetooth), a wireless LAN, IEEE 802.11 (Wi-Fi), a wireless MAN, IEEE 802.16 (WiMax), WiBro, HiperMAN, mobile WAN, GSM, GPRS, EDGE, HSCSD, iDEN, D-AMPS, IS-95, PDC, CSD, PHS, WiDEN, CDMA2000, UMTS, 3GSM, CDMA, TDMA, FDMA, W-CDMA, HSDPA, W-CDMA, FOMA, 1×EV-DO, IS-856, TD-SCDMA, GAN, UMA, HSUPA, LTE, 2.5G, 3G, 3.5G, 3.9G, 4G, 5G, 6G, 7G and beyond, another wireless system and another mobile system.

FIG. 1 illustrates an application for the disclosed breathing monitoring system, where one or more patients lying in bed while their breathings are being monitored. The patients' chest movements can impact the wireless signals transmitted from a Bot, which may be a transceiver, to an Origin, which may be another transceiver. The disclosed system may capture the signals via the Origin and extract feature about the breathing patterns from the captured signals. The breathing monitoring system can calculate the patient's breathing rate, number of people in the room, and may trigger an alarm if the breathing rate drops/changes suddenly.

Applications of the disclosed breathing monitoring system may include monitoring the breathing rates of newborns, detecting abnormal breathing patterns such as apnea for the elderly, and studying the sleeping quality of inhabitants of a house during nights. Moreover, the disclosed breathing monitoring system can be applied in life detection, for instance, searching and rescuing survivors in the debris of collapsed buildings at sites suffered by earthquake. In such scenarios, breathing is considered as the most crucial type of motion that can be detected due to its presence even when a person is unconscious.

The present teaching can exploit the channel state information (CSI), a fine-grained portrait of the environment that can capture the variations caused by inhalations and exhalations of breathing. The disclosed system may project CSIs onto a time-reversal (TR) resonating strength feature space, which is analyzed via spectral analyzer (e.g. based on the MUSIC/Root-MUSIC based algorithms) for breathing detection and breathing rate estimation.

Figure 2:
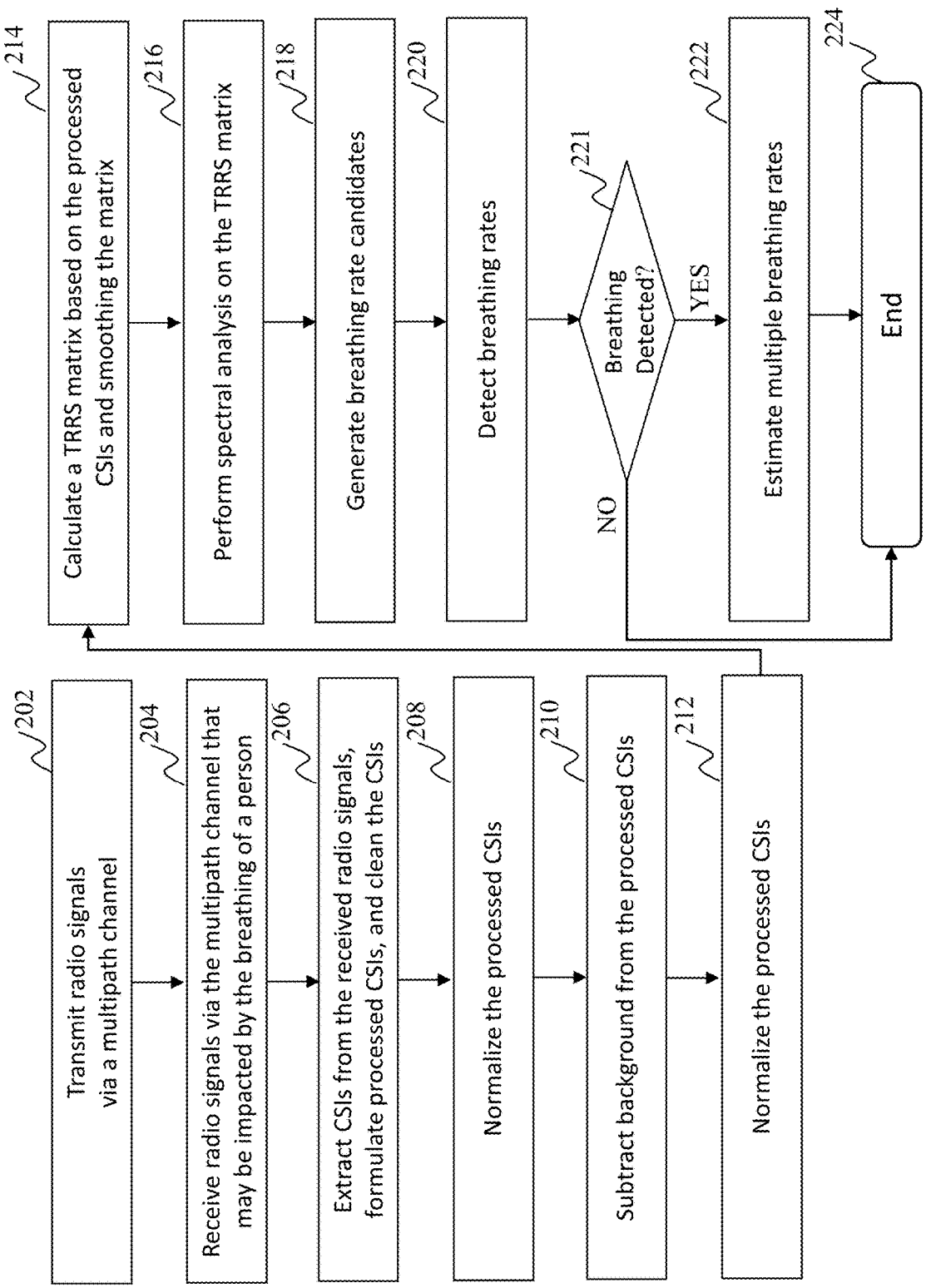
FIG. 2 shows a flow chart for an exemplary process of the breathing monitoring system, according to an embodiment of the present teaching.

FIG. 2 shows a flow chart showing a general process of breathing monitoring. At 202, a transceiver/transmitter/Bot can transmit radio signals (e.g., a pulse or a pseudo random sequence) via a multipath channel. Then at 204, a receiver/another transceiver/Origin can receive the signals from the multipath channel that are impacted by the breathing of a person. The CSIs are extracted at 206 from the received radio signals using channel estimation. To improve the breathing monitoring, the system can also process the CSIs to obtain processed CSIs, e.g., formulate CSI fingerprints using the CSI fingerprint formulating methods disclosed in patent applications PCT/US2017/015909 and PCT/US2016/066015, which are incorporated herein by reference in their entireties. The phase distortion of the CSIs can be cleaned using phase offset compensation methods disclosed in patent applications PCT/US2017/015909 and PCT/US2016/066015.

Interference/background in the CSIs can be removed at 210 by background subtraction, and the CSIs can be normalized to a unit power before and after the background subtraction, at 208 and 212 respectively. Then a TRRS (time-reversal resonating strength) matrix is calculated at 214 based on the processed CSIs. The TRRS matrix can also be smoothed (e.g., averaged over time) to improve the rank condition of the matrix. After performing spectral analysis at 216 on the TRRS matrix, a set of breathing rate candidates are generated at 218, based on which the existence of breathing human can be detected at 220. For example, by comparing a peak in the spectrum of MUSIC-based spectral analysis with a threshold, or by comparing a distribution of roots after the Root-MUSIC-based spectral analysis with a threshold, the existence of breathing can be detected at 220. If breathing is detected at 221, the breathing rates can be estimated at 222. Otherwise, the process ends at 224.

According to one embodiment, some extensive experiment results demonstrated that the disclosed system can work well in around a minute of CSI measurements. More specifically, it can achieve a mean accuracy of 98.65% in breathing rate estimation for a dozen people under the line-of-sight (LOS) scenario and a mean accuracy of 97.3% in breathing rate estimation up to 7 people under the NLOS scenario, both with 63 seconds of measurement. Moreover, the disclosed system can estimate the number of people with an error around 1. The disclosed system is robust against packet loss.

The disclosed system can employ a number of wireless transmitters and receivers working together to implement the breath monitoring functionality. One possible embodiment of the disclosed system is to use off-the-shelf Wi-Fi wireless transceivers. But the disclosed system is not limited to such devices. It can be used with any wireless devices that can provide channel state information (CSI) as a part of its operation (e.g. Bluetooth, 3GPP LTE transceivers, or any custom-designed non-standard-compliant wireless transceiver). The present teaching discloses methods, apparatus, devices, systems, and servers that take this CSI as input, extract features relevant to breathing (or other vital signs having a periodic pattern) that describe the wireless channel behavior between the transmitter(s) and the receivers(s), and generate outputs that quantify the breathing rates of people being in the vicinity of the wireless transceivers.

Channel Model

In an exemplary Orthogonal Frequency Division Multiplexing (OFDM) system, such as the current IEEE 802.11g, 802.11n, 802.11ad, or 802.11ac or the 3GPP LTE wireless standard, the information-bearing signal is sent over the available frequency band over a number of parallel subcarriers. Each subcarrier can be treated as an independent narrow-band channel, and the total transmitted signal is the superposition of all the signals on all subcarriers. The CSI may summarize the behavior of the wireless channel (transmission medium) in the frequency domain by describing how the amplitude and phase of the transmitted signal is affected over each subcarrier. When the breathing is not present, the time series of CSIs on subcarrier k, k ∈ 𝒦 where 𝒦 is the set of usable subcarriers with K elements, can be written as $H_k(t)$ expressed as below:

$$H_k(t) = \sum_{\ell=1}^{L} \alpha_\ell e^{-j2\pi \frac{d_\ell}{\lambda_k}} + e_k(t), \quad (1)$$

where L is the total number of multipath components (MPC), $\alpha_\ell$ is the complex gain of path $\ell$, $\tau_\ell$ is the delay of path $\ell$, and $\lambda_k$ is the wavelength of the k-th subcarrier given by $$\lambda_k = \frac{c}{f_c + \frac{k}{NT_s}}.$$

Here, $f_c$ is the carrier frequency, c is the speed of the light which is 3×10⁸ m/s, $T_s$ is the sampling interval which is 25 nanoseconds under 40 MHz Wi-Fi bandwidth and 50 nanoseconds under 20 MHz bandwidth, N is the size of FFT which is 128 for 40 MHz and 64 for 20 MHz, and $e_k(t)$ is the channel noise on subcarrier k at time t. Since the channel is assumed to be static as no breathing is present, the gains and delays of the MPCs are static. Due to the presence of breathing, part of the channel gains and path delays may change periodically with time t. For simplicity, one can assume that breathing affects path 1. The channel gain and path delay for path 1 can then be written as $$\alpha_1(t) = \alpha_1 \times \left(1 + \frac{\Delta d_1}{d_1} \sin\theta \sin(2\pi ft + \phi)\right)^\gamma \quad (2)$$

where $\alpha_1$ is the channel gain without breathing, $d_1$ is the path length without impact of breathing, $\Delta d_1$ is the additional positional displacement of path 1 with breathing, $\theta$ is the incident angle between the subject and the impinging electromagnetic wave, f is the breathing frequency, $\phi$ is the initial phase of breathing. One can see that, with the approximation of $d_1 \gg \Delta d_1$, $\alpha_1(t) \approx \alpha_1$, and the variation in the path gain $\alpha_1$ is negligible. On the other hand, breathing affects the phase of path 1 as well. The path length $d_1(t)$ can be expressed as $$d_1(t) = d_1 + \Delta d_1 \sin\theta \sin(2\pi f t + \phi) \quad (3)$$

Now, $H_k(t)$ takes the form $$H_k(t) = \alpha_1 e^{-j2\pi \frac{d_1(t)}{\lambda_k}} + \sum_{\ell=2}^{L} \alpha_\ell e^{-j2\pi \frac{d_\ell}{\lambda_k}} + e_k(t) \quad (4)$$

which can be further written as $$H_k(t) = \alpha_1 e^{-j2\pi \frac{d_1}{\lambda_k}} e^{-j2\pi \frac{\Delta d_1 \sin\theta \sin(2\pi f t + \phi)}{\lambda_k}} + \sum_{\ell=2}^{L} \alpha_\ell e^{-j2\pi \frac{d_\ell}{\lambda_k}} + e_k(t) \quad (5)$$

Notice that the first term on the right hand side (RHS) of $H_k(t)$ as shown in (5) can be decomposed into an infinite summation according to the Jacobi-Anger expansion, as $$e^{-j2\pi \frac{\Delta d_1 \sin\theta \sin(2\pi f t + \phi)}{\lambda_k}} = \quad (6)$$
$$\sum_{m=-\infty}^{+\infty} (-1)^m J_m(v_k) e^{jm(2\pi f t + \phi)} = \sum_{m=-\infty}^{+\infty} (-1)^m J_m(v_k) e^{jm2\pi f t} e^{jm\phi},$$

where $v_k = 2\pi \sin\theta \Delta d_1 / \lambda_k$ and $J_m(x)$ is the m-th order Bessel function with argument x. It can be seen that in addition to the spectral line at f, there also exist an infinite number of harmonics with spectral lines at mf with m being an integer. However, in practice, $J_m(v_k)$ may decay quickly for $|m| \geq 2$ given the typical values of $v_k$. Therefore, equation (6) can be written as $$e^{-j2\pi \frac{\Delta d_1 \sin\theta \sin(2\pi f t + \phi)}{\lambda_k}} \approx \sum_{m=-1}^{+1} (-1)^m J_m(v_k) e^{jm2\pi f t} e^{jm\phi} \quad (7)$$

which includes two spectral lines located at $\pm f$ as well as a DC component.

Therefore, $H_k(t)$ can be expressed as $$H_k(t) = \quad (8)$$
$$\underbrace{\alpha_1 e^{-j2\pi \frac{d_1}{\lambda_k}} \sum_{m=-1}^{+1} (-1)^m J_m(v_k) e^{jm2\pi f t} e^{jm\phi}}_{S_k(t)} + \underbrace{\sum_{\ell=2}^{L} \alpha_\ell e^{-j2\pi \frac{d_\ell}{\lambda_k}}}_{I_k} + e_k(t)$$

with $v_k = 2\pi \sin\theta \Delta d_1 / \lambda_k$.

Notice that the dynamic model of $H_k(t)$ shown in equation (8) can be changed accordingly under different scenarios, such as multiple people breathing, one person affecting a number of multipath components at the same time, or different people affecting the same multipath component at the same time. In practice, one may consider the following two random disturbances. First random disturbance is the random phase distortion caused by the differences between the local oscillators of the Wi-Fi transmitter and receiver. Second random disturbance is the random amplitude variation due to the automatic gain control (AGC), which tunes the input voltage to fully utilize the dynamic range of the analog-to-digital converter (ADC).

With these two effects, $H_k(t)$ can be modified as $$H_k(t) = \Gamma_t(S_k(t) + I_k) e^{j(\alpha_t + \beta_t k)} + e_k(t) \quad (9)$$

where $\Gamma_t$ is the real AGC gain at time t; $\alpha_t$ is the initial phase distortion at time t; $\beta_t$ is the linear phase distortion at time t.

Background Subtraction

One can view the three parts of $H_k(t)$ in equation (8) as (i) signal, (ii) interference, and (iii) noise, respectively. It is important to mitigate the impact of the interference $I_k$ to improve the decodability of $S_k(t)$. For convenience, $I_k$ is called the background of subcarrier k. Besides directly using $H_k(t)$, the system can also formulate CSI fingerprint using methods disclosed in patent applications PCT/US2017/015909 and PCT/US2016/066015. Also, one may sanitize the CSI phase of $H_k(t)$ to compensate phase distortions due to imperfect hardware using methods disclosed in patent applications PCT/US2017/015909 and PCT/US2016/066015. For example, the phase distortion compenstation can be done by: CSI folding and phase de-linearization.

One can assume that the phase of $H_k(t)$ has been sanitized as $$H'_k(t) = H_k(t) e^{-j(\hat{\alpha}_t + \hat{\beta}_t k)} = \Gamma_t(S_k(t) + I_k) e^{j(\Delta\alpha_t + \Delta\beta_t k)} + e_k(t) e^{-j(\hat{\alpha}_t + \hat{\beta}_t 0)}, \quad (10)$$

where $\hat{\alpha}_t$ is the estimated initial phase distortion at time t and $\hat{\beta}_t$ is the estimated linear phase distortion at time t. The channel power at time t is the $\ell_2$ norm of $H'_k(t)$, or, $$\|H'(t)\|_2 = (\sum_{k \in \mathcal{K}} |H'_k(t)|^2)^{1/2}. \quad (11)$$

$|H'_k(t)|^2$ can be written as $$|H'_k(t)|^2 = \Gamma_t^2 |S_k(t) + I_k|^2 + |e_k(t)|^2 + [\text{Cross Terms}]_k \quad (12)$$

Then, the summation of $|H'_k(t)|^2$ is $$E_t = \sum_{k=u_1}^{u_K} \Gamma_t^2 |S_k(t) + I_k|^2 + |e_k(t)|^2 + [\text{Cross Terms}]_k \quad (13)$$
$$= \Gamma_t^2 \sum_{k=u_1}^{u_K} |S_k(t) + I_k|^2 + |e_k(t)|^2 + \sum_{k=u_1}^{u_K} [\text{Cross Terms}]_k$$

Given a high SNR scenario, the system can normalize H'(t) such that $E_t = 1$, $\forall t$, which is equivalent to adjust $\Gamma_t^2$ to the same $\Gamma^2$. Here, one can denote the normalized CSI as H"(t).

There are two ways to mitigate $I_k$. The first is by Principle Component Analysis (PCA). PCA does not require normalization. First of all, one can assemble the K×1 CSIs into a matrix H with N columns, where N is the number of CSI snapshots, i.e., CSIs received at N different time instances. As long as N≥K, one could fully exploit the inherent structure of H using PCA. One can simply fit H into the following model in the least-square sense:

$$H = \sigma BB' \quad (14)$$

Here, σ is a scaling factor and B stands for the unit norm CSI that representing the background. Equation (14) is simply the rank-1 fitting of H, which can be done easily by taking the first principle component of H, i.e., finding the largest eigenvalue and the corresponding singular vector using singular value decomposition (SVD).

The second method is to take average over H"(t) to derive the background CSI and subtract it from all CSIs. For example, one can simply take average over all $N_t$ time instances of each subcarrier k of the normalized CSI H"(t), i.e., $$B_k = \frac{1}{N} \sum_{t=t_1}^{t_N} H_k''(t) \quad (15)$$

Using real experiment data, these two methods may lead to highly similar results. However, method 2 is much simpler than method 1 where SVD is involved, which could be slow for H with a large dimension. Therefore, one can simply use equation (15) to calculate the background over a time period for each subcarrier. The CSI at time t and subcarrier k with background removed can be written as $$\overline{H}_k(t) = H''_k(t) - B_k \quad (16)$$

Given uniform sampling and that $t_N - t_1 = cT$, where T is the interval of breathing and $c \neq 0$ is an integer, it can be proved that $\overline{H}_k(t)$ only contains the harmonics of f where f is the breathing frequency. In other words, under certain assumptions, the background subtraction could perfectly mitigate the interference term $I_k$ while leaving the useful terms intact, i.e., $$\overline{H}_k(t) = \alpha_1 e^{-j2\pi d_1/\lambda_k} [-J_{-1}(v_k)e^{-j2\pi ft}e^{-j\phi} - J_1(v_k)e^{j2\pi ft}e^{j\phi}] + \quad (17)$$

$$e_k(t)$$

$$= \alpha_1 e^{-j2\pi d_1/\lambda_k} [J_1(v_k)(e^{-j2\pi ft}e^{-j\phi} - e^{j2\pi ft}e^{j\phi})] + e_k(t)$$

$$= \alpha_1 e^{-j2\pi d_1/\lambda_k} [-2J_1(v_k)j\sin(2\pi ft + \phi)] + e_k(t)$$

In practice, perfect background subtraction can hardly be achieved due the following reasons. First, the interference term $I_k$ can be time-varying and should be written as $I_k(t)$, due the presence of motions in the environment caused by the movement of objects and people. Second, since the breathing frequency f is unknown, the period of breathing, T, is also unknown. If $t_N - t_1 \neq cT$, then, equation (17) should be modified as $$\overline{H}_k(t) = -2J_1(v_k)j \sin(2\pi ft+\phi) + r_k(t) + e_k(t) \quad (18)$$

where $r_k(t)$ is the remaining term due to the fact that $t_N - t_1 \neq cT$.

Breathing Rate Estimation

The breathing rates can be extracted by spectral analysis from the collected CSI information. Spectral analysis algorithms can be divided into two categories: non-parametric and parametric.

The non-parametric algorithms do not make any assumption on the covariance structure of the CSIs, leading to their inherent lower resolution in comparison with the parametric algorithms. The non-parametric algorithms include but are not limited to the periodogram, Blackman-Tukey, and Welch algorithms. The spectral resolution of these algorithms is strictly limited by 1/T, where T is the total time of measurement in seconds.

On the other hand, the parametric algorithms make assumptions on the covariance structure of the CSIs. For instance, in the MUSIC and Root-MUSIC algorithms, one may assume the knowledge of the signal dimension. The breathing monitoring method disclosed in the present teaching can adopt MUSIC and Root-MUSIC as the spectral analysis algorithms due to their higher resolution in comparison to the non-parametric algorithms, especially in a dynamic environment. It can be understood that other spectral analysis algorithms can also be adopted to estimate the breathing rates by the disclosed system.

Since human breathing may not be strictly stationary, the breathing monitoring system can operate on overlapping time windows. On link d from a transmit antenna to a receive antenna, for each time window of W seconds, the breathing monitoring system can calculate the resonating strength matrix R using the CSIs after phase calibration and background subtraction. The calculations may be repeated for each time window shifted by P seconds. Given M CSI measurements with packet rate $f_s$, the breathing monitoring system can formulate a total of $$V_{max} = \text{floor}\left(\frac{Mf_s - W}{P}\right)$$

time windows. Steps for breathing monitoring using CSI samples inside each time window are described in detail as below.

After background subtraction, one can calculate the TRRS matrix R with its (i–j)-th entry defined as the TRRS between the i-th sampled CSI and the j-th sampled CSI, expressed as below, assuming a CSI sampling rate of $T_{samp}$, i.e., obtaining one CSI every $1/T_{samp}$ seconds, $$\gamma[\overline{H}((i-1)T_{samp}), \overline{H}((j-1)T_{samp})] = \quad (19)$$

$$\frac{\sum_{k \in \mathcal{K}} \overline{H}_k((i-1)T_{samp})\overline{H}_k^*((j-1)T_{samp})e^{-j(\phi_{ini}^* + \phi_{lin}^* k)}}{\|\overline{H}((i-1)T_{samp})\|_2 \|\overline{H}((j-1)T_{samp})\|_2}$$

where $\mathcal{K}$ is the index of usable subcarriers. Notice that $e^{-j(\phi_{ini}^* + \phi_{lin}^* k)}$ is introduced to compensate the effect of linear phase distortions, where $\phi^*_{lin}$ is calculated as $$\phi_{lin}^* = \arg\max_{\phi} \sum_{k \in \mathcal{K}} \overline{H}_k((i-1)T_{samp})\overline{H}_k^*((j-1)T_{samp})e^{-j\phi k}, \quad (20)$$

while $\phi^*_{ini}$ is given as $$\phi_{ini}^* = \angle (\sum_{k \in \mathcal{K}} \overline{H}_k((i-1)T_{samp}) \overline{H}_k^*((j-1)T_{samp})e^{-j\phi_{lin}^* k}) \quad (21)$$

The denominator of (19) normalizes the TRRS such that $|\gamma[\overline{H}((i-1)T_{samp}), \overline{H}((j-1)T_{samp})]| \in [0,1]$; $\|x\|_2$ is the $\ell_2$ norm of the vector x. Assuming a total of N CSI snapshots, the system can calculate the N×N TRRS matrix R. Then, the system can perform spectral analysis, e.g., by using MUSIC and/or Root-MUSIC algorithm to extract breathing rates.

Figure 3:
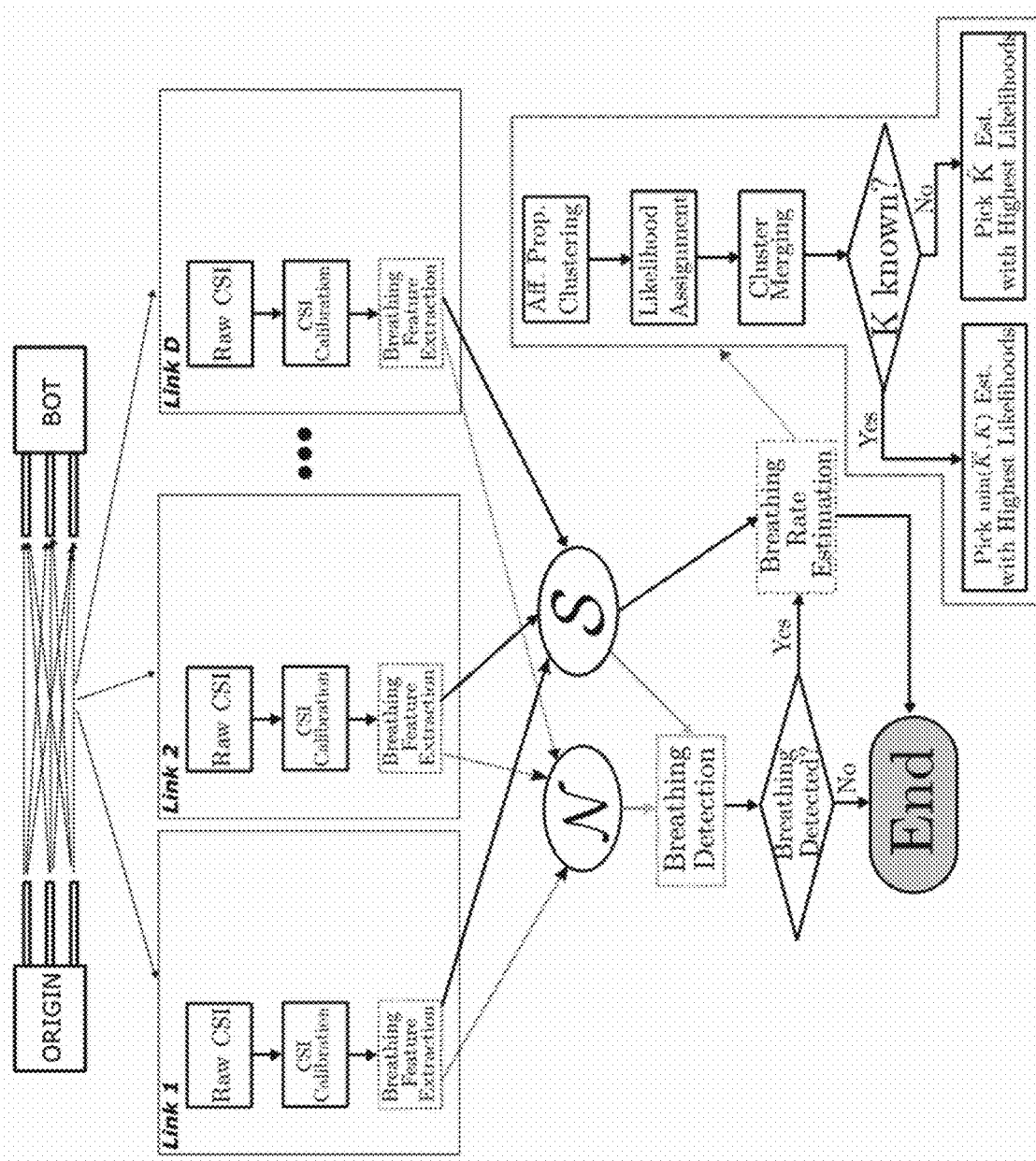
FIG. 3 shows an exemplary diagram for the breathing monitoring system, according to an embodiment of the present teaching.

FIG. 3 shows an exemplary diagram for the breathing monitoring system, according to an embodiment of the present teaching. As shown in FIG. 3, to capture CSIs, the system can leverage Wi-Fi NICs to support the channel sounding mechanism between the access point (AP) and station (STA), or between a Bot and a Origin. Both AP and STA may be equipped with one or more antennas resulting in a total of D transmitting-receiving links. CSIs captured on each transmitting-receiving link are calibrated to mitigate the impact of residual synchronization errors. The calibrated CSIs are further processed by the breathing feature extraction module which generates two sets: $\mathcal{N}_d$ and $\mathcal{N}_d$. $\mathcal{S}_d$ is a set containing the breathing rate estimations on link d obtained by solving a polynomial that will be detailed later in the present teaching, while $\mathcal{N}_d$ is a set containing a number of empty sets indicating the occurrences that the polynomial is insolvable. The sets $\mathcal{N}_d$ and $\mathcal{S}_d$ with d=1, . . . , D are combined into the set $\mathcal{N}$ and $\mathcal{S}$. The disclosed breathing monitoring system can learn from the statistics of $\mathcal{S}$ and $\mathcal{N}$ to train a logistic regression binary classifier for breathing detection.

If breathing is detected, the system can perform clustering on $\mathcal{S}$, which partitions the breathing rate estimations into different clusters. Then, it can assign likelihood to each cluster, indicating the possibility of that cluster in representing the breathing rate. The centroid of each cluster is interpreted as the estimated breathing rate of one person. Because closely separated breathing rate estimations might actually correspond to the same person, the system can merge clusters when their centroid differences fall below a threshold and recalculate the breathing rate estimations as well as their likelihoods. Then the system may output the breathing rate estimates with the highest likelihoods.

Eigenvalue Decomposition and Obtaining Noise Subspace

Eigenvalue Decomposition: The first step to the MUSIC and/or Root-MUSIC algorithm is the eigenvalue decomposition (EVD), which leads to $$R = U \wedge U^\dagger \quad (22)$$

where U is a N×N orthonormal matrix, $\wedge$ is a N×N diagonal matrix with diagonal entries the eigenvalues of R, and $\dagger$ is the Hermitian operator.

Obtaining Noise Subspace: For a signal dimension of p, the system can partition U into a signal subspace and a noise subspace. The first p columns of U constructs the signal subspace $U_s$, while the last N−p columns of U constructs the noise subspace $U_n$.

MUSIC-Based Breathing Estimation with Machine Learning

According to one embodiment of the present teaching, the disclosed system may perform breathing estimation using the MUSIC algorithm with machine learning. The MUSIC algorithm may estimate the frequency based on the distance from the signal subspace to the noise subspace. More specifically, it can evaluate the pseudo-spectrum $P_{mu}(f)$ with $f \in \mathcal{F}$ where $\mathcal{F}$ is the possible region of f and is in general discrete considering that the system cannot achieve infinite resolution in real-life. $P_{mu}(f)$ is expressed as $$P_{mu}(f) = \frac{\|s_f\|_2^2}{\|s_f U_n\|_2^2}, \quad (23)$$

where $s_f$ is the steering vector parameterized by f, given as $$s_f = [1 \, e^{j2\pi fT_s} e^{j4\pi fT_s} \ldots e^{j(N-1)2\pi fT_s}]^T \quad (24)$$

where T is the transpose operator. Notice that f in equation (23) is limited in the range of [0, $f_{sound}/2$] where $f_{sound}$ is the sounding rate, i.e., the rate at which CSI samples are acquired which is in general in the range of 5~200 Hz. Thus, $f_{sound}/2$ is the critical Nyquist rate.

Spectrum Folding: according to equation (8), the pseudo-spectrum is symmetric around f=0. Thus, to improve the performance of MUSIC, one can fold the spectrum around f=0 as $$P'_{mu}(f) = \tfrac{1}{2}(P_{mu}(f) + P_{mu}(-f)). \quad (25)$$

Clearly, one can observe from equation (25) that $P'_{mu}(0) = P_{mu}(0)$.

Spectrum Sifting: one may realize that the range of human breathing rates is limited in a certain range, say, $f_{min}$ to $f_{max}$, where $f_{max} \geq f_{min} \geq 0$ and $f_{max} \leq f_{sound}/2$. Therefore, one can trim $P'_{mu}(f)$ into the range of $f_{min}$ to $f_{max}$. For convenience, it is written as $\mathcal{F}_{human} = [f_{min}, f_{max}]$.

Peak Detection: By localizing the peaks of $P_{mu}(f)$ with $f \in \mathcal{F}_{human}$, one can estimate f as $\hat{f}$. Based on some certain criterion, e.g., persistence, minimum peak distance, minimum peak height, peak prominence, peak width, and/or a mixture of these criterion, one can choose $\overline{K}$ peaks from $P_{mu}(f)$, denoted as $\{\hat{f}_1, \hat{f}_2, \ldots, \hat{f}_{\overline{K}}\}$ which are ranked according to the chosen criterion.

Partitioning Breathing Rate Estimation: For Wi-Fi systems with multiple transmitting and receiving antennas (known as the Multiple-Input-Multiple-Output (MIMO) system) and/or Wi-Fi systems capable of frequency hopping and working on multiple channels, with a total of D antenna links/Wi-Fi channels, one could formulate several sets of breathing rate estimations, say, $\hat{f} = [\hat{f}_1 \, \hat{f}_2 \, \hat{f}_3 \ldots \hat{f}_D]$, where $\hat{f}_i$ is the vector standing for the breathing rate estimations extracted from the pseudo-spectrum of the i-th link/Wi-Fi channel, i.e., $P_{mu,i}(f)$, $f \in \mathcal{F}_{human}$.

Then, the system can perform generic clustering method to partition $\hat{f}$ into multiple clusters, e.g., affinity propagation and k-means clustering, with each cluster contains several breathing rate estimations in $\hat{f}$ close to each other and stands for the breathing rate estimations associated with one specific person.

For example, clustering with affinity propagation is detailed as below. In case that breathing is detected, the estimations in $\mathcal{S}$, as shown in FIG. 3, are fed into the affinity propagation clustering algorithm, which takes a similarity matrix as input. Affinity propagation works by passing the responsibility message to decide which estimations are exemplars, and the availability message to determine the membership of an estimation to one of the clusters. The similarity between estimated breathing rates $\hat{f}_i$ and $\hat{f}_j$ can be given as $\exp(-|\hat{f}_i - \hat{f}_j|)$.

When there are more than one person and their breathing rates are different, then, the system can observe multiple clusters as well. For each cluster, the system can calculate the following statistics: a) the normalized population (NP) of each cluster, indicating the concentration of elements of each cluster, b) the normalized variance (NV) of each cluster, indicating the tightness of each cluster, and c) the cluster centroid (CC) of each cluster. Clusters with higher centroids are less likely than the lower ones considering the nature of human breathing.

By evaluating the aforementioned statistics for each cluster, one could assign likelihoods, denoted as $l_1, l_2, \ldots, l_U$ to all clusters with a total of U clusters, to determine the likelihood of each cluster in representing the breathing rate associated with one person. For the Root-MUSIC-based approaches which would be discussed later, this step can be slightly modified to harness the complex roots produced by the Root-MUSIC algorithm. Instead of performing clustering on $\hat{f}$, the system can partition the complex roots $\hat{z}$ directly, where $\hat{z}$ stands for the set of all complex roots. Compared with clustering using the breathing rates $\hat{f}$, using the complex roots could potentially enhance the clustering results since the information about the radius ρ is also fully utilized in addition to the breathing rates, which are simply the angles ($\measuredangle$) of the complex roots $\hat{z}$.

One example of likelihood assignment for each cluster is discussed in detail below. When affinity propagation returns U clusters, the disclosed system may evaluate the population, variance, and centroid of each cluster, denoted as $p_i$, $v_i$, and $\hat{f}_i$ respectively. Then, $p_i$ and $v_i$ are normalized as $$\bar{p}_i = \frac{p_i}{\sum_{i=1}^{U} p_i} \text{ and } \bar{v}_i = \frac{v_i}{\sum_{i=1}^{U} v_i}.$$

The likelihood for cluster i may be calculated as $$l_i = \begin{cases} 0, & v_i = 0, p_i = 1 \\ L(\bar{p}_i, \bar{v}_i, \hat{f}_i), & \text{Otherwise} \end{cases} \quad (26)$$

with $$L(\bar{p}_i, \bar{v}_i, \hat{f}_i) = \frac{\exp(\omega_p \bar{p}_i - \omega_v \bar{v}_i - \omega_f \hat{f}_i)}{\sum_{i=1}^{U} \exp(\omega_p \bar{p}_i - \omega_v \bar{v}_i - \omega_f \hat{f}_i)}, \quad (27)$$

where $\omega_p$, $\omega_v$, and $\omega_f$ are positive weighting factors to account for different scales of the corresponding terms. The denominator of $L(\bar{p}_i, \bar{v}_i, \hat{f}_i)$ is a normalization factor.

As can be seen from the expression of $L(\bar{p}_i, \bar{v}_i, \hat{f}_i)$ in equation (26), the likelihood assignment incorporates a term related to the estimated breathing rate $\hat{f}_i$. One insight is that high breathing rate should be less likely than low breathing rate, and high breathing rate might correspond to the harmonics of actual breathing rates. As can be seen from the expression of $l_i$ above in equation (27), clusters with $v_i=0$ and $p_i=1$ are singletons that must be removed since they are caused by interference or noise. Thus, one can assign likelihoods of 0 to singletons.

Cluster Merging: In practice, due to the existence of noise, it is possible that two adjacent clusters are actually associated with the breathing of the same person. Thus, the present teaching introduces a parameter denoted as Γ and known as the merging radius: as long as the centroid distance between two different clusters falls below Γ, one can merge these clusters into one single cluster. When the NPs of these two clusters are $p_1$ and $p_2$, NVs as $v_1$ and $v_2$, centroids as $c_1$ and $c_2$, the likelihoods as $l_1$ and $l_2$, then, the merged cluster has a NP of $p'_1 = p_1 + p_2$. On the other hand, the variance of the merged cluster is re-evaluated based on the elements in the merged cluster. The cluster centroid is calculated as $c'_1 = (l_1 c_1 + l_2 c_2)/(l_1 + l_2)$. The likelihood $l'_1$ is re-assigned based upon the updated NP, NV, and CC.

An example of clustering merging is shown in detail below. For instance, when cluster i and i+1 are to be merged since $|\hat{f}_i - \hat{f}_{i+1}| < \gamma$, one can denote the new cluster as i', whose population is calculated as $\bar{p}_{i'} = \bar{p}_i + \bar{p}_{i+1}$. The variance of cluster i' is re-evaluated based on the breathing rate estimations in cluster i'. The breathing rate estimation of cluster i' is updated as:

$$\hat{f}_{i'} = \frac{l_i \hat{f}_i + l_{i+1} \hat{f}_{i+1}}{l_i + l_{i+1}}. \quad (28)$$

Then, the disclosed system can evaluate the likelihood of cluster i' by $L(\bar{p}_{i'}, \bar{v}_{i'}, \hat{f}_{i'})$ in equation (27). Merging of more than two clusters can be generalized from the aforementioned steps, which is omitted here for brevity. When the number of clusters is $\bar{K}$ after merging and K is known, the disclosed system may directly output $K_o = \min(\bar{K}, K)$ breathing estimations with the highest likelihoods.

Figure 7:
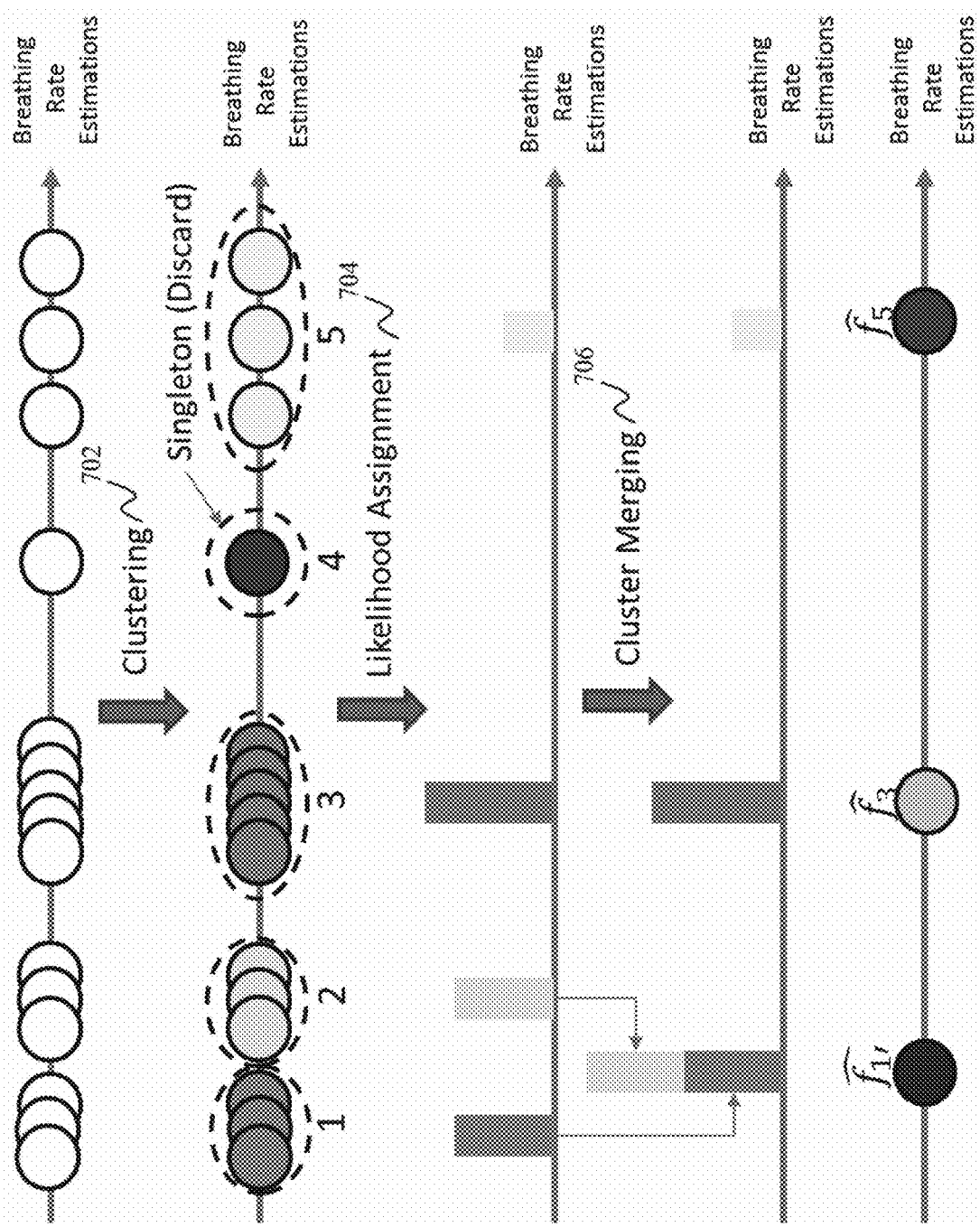
FIG. 7 illustrates a process of likelihood assignment and cluster merging, according to an embodiment of the present teaching.

The procedures for likelihood assignment and cluster merging are illustrated in FIG. 7. As shown in FIG. 7, the breathing rate candidates may be processed at 702 using a clustering algorithm to generate 5 different clusters. Then, the disclosed system can assign likelihood at 704 to each of these clusters. The clusters with only one element, i.e., singletons, may be removed at this step. After 704, a total of 4 clusters remained in this example. Given that the centroid distance between cluster 1 and cluster 2 is smaller than the merging radius, the system can merge these two clusters at 706 into a single larger cluster. Finally, the disclosed system may use the centroids of merged clusters as the breathing rate estimations.

Breathing Rate Estimation: After performing the above calculations, the breathing rates can be estimated as below. When the total number of clusters after the step of cluster merging is U', and the likelihoods for these clusters are given as $l'_1, l'_2, \ldots, l'_{U'}$, then, one can produce the breathing rate estimations under two different scenarios: (a) the number of people K is known, and (b) the number of people K is unknown.

For case (a), there may be two sub-cases: ($a_1$) U'≤K, and ($a_2$) U'≤K. For $a_1$, one can detect U' out of K people. In other words, the miss detection rate is (K−U')/K. For $a_2$, the miss detection rate is 0 and one can use the centroids of the K clusters with the K highest likelihoods as the breathing rate estimations for K people.

For case (b), one may formulate an estimation on the people number K first, which would be elaborated later below. The rest steps may be identical to case (a).

Figure 4:
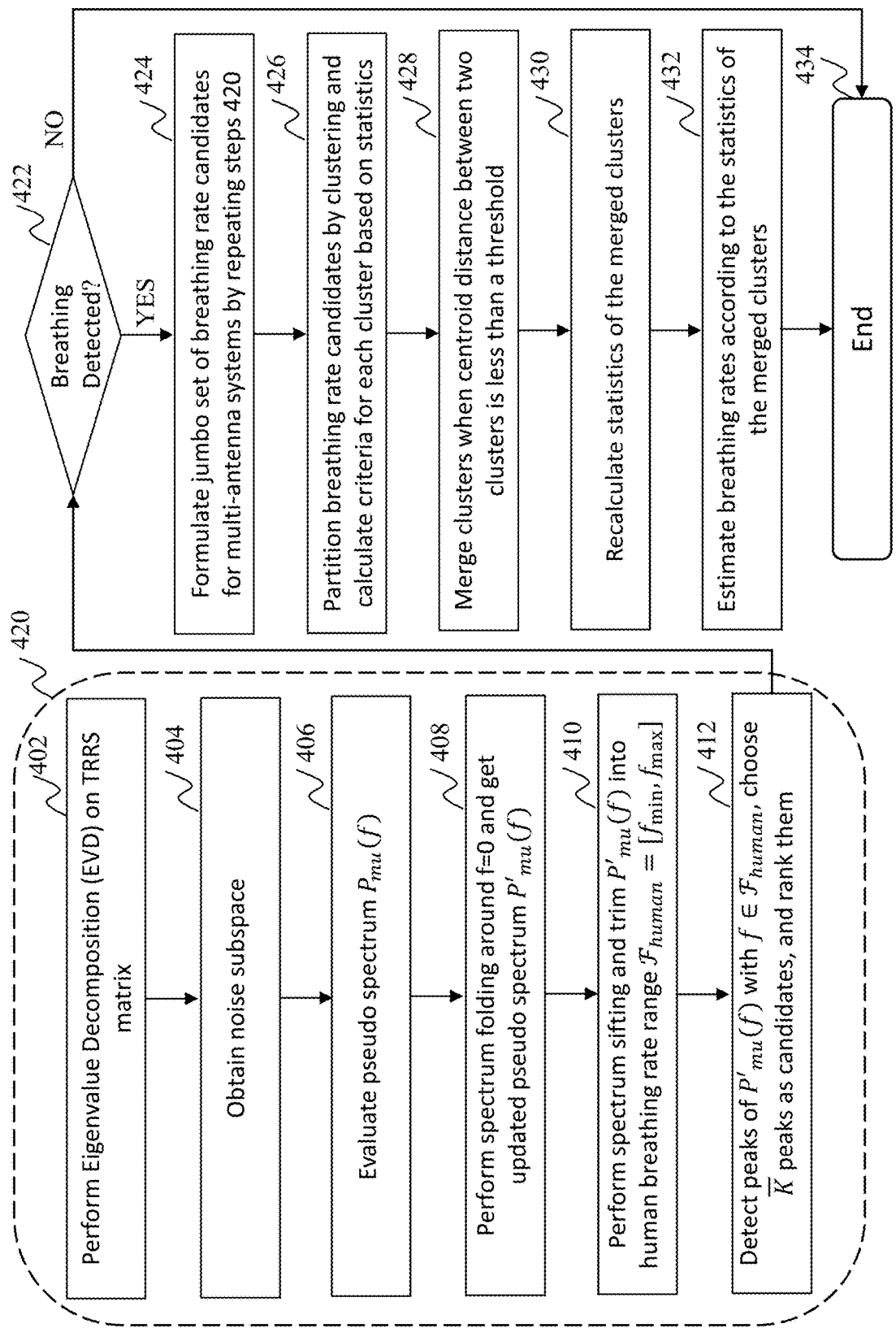
FIG. 4 shows an exemplary process for breathing detection and monitoring using a MUltiple SIgnal Classification (MUSIC) algorithm with machine learning, according to an embodiment of the present teaching.

FIG. 4 shows an exemplary process for breathing detection and monitoring using a MUSIC algorithm with machine learning, according to an embodiment of the present teaching. As shown in FIG. 4, Eigenvalue Decomposition (EVD) is performed at 402 on a TRRS matrix that is obtained based on CSIs, where the CSIs may be extracted from received wireless signals that may be impacted by breathing of a person. A TRRS, as strength of the TR resonance, is a measurement of a similarity between two CSI samples. TRRS can be used as a matching score between any two CSIs. The higher the TRRS is, the more similar two CSIs are. It can be understood that besides TRRS, a degree of similarity between two CSIs can also be represented by other measurements, e.g. a cross-correlation, an inner product of two vectors, a similarity score, a distance score, a phase correction, a timing correction, a timing compensation, and a phase offset compensation, of two CSIs.

Noise subspace is obtained at 404. Pseudo spectrum, e.g. $P_{mu}(f)$, may be evaluated at 406. Spectrum folding around $f=0$ is performed at 408 to get updated pseudo spectrum $P'_{mu}(f)$. Spectrum sifting is performed at 410 and $P'_{mu}(f)$ is trimmed into human breathing rate range $\mathcal{F}_{human} = [f_{min}, f_{max}]$. Peaks of $P'_{mu}(f)$ are detected at 412 with $f \in \mathcal{F}_{human}$, and $\bar{K}$ peaks are chosen and ranked as candidates. It can be understood that the steps 402-412, referred together as 420, may be repeated for each transmitter-receiver antenna link, e.g. for a multi-antenna system.

At 422, it is determined whether breathing is detected, e.g. based on breathing rate candidates determined at 412. If breathing is detected at 422, then a jumbo set of breathing rate candidates may be formulated at 424 for a multi-antenna system by repeating the steps 420, then the process moves on to 426. Otherwise, if breathing is not detected at 422, the process may end at 434, or in some embodiments go back to 402 to start over.

Breathing rate candidates are partitioned at 426 by clustering, and criteria are calculated for each cluster based on statistics. Clusters are merged at 428 when centroid distance between two clusters is less than a threshold. Statistics of the merged clusters are recalculated at 430. Breathing rates are estimated at 432 according to the statistics of the merged clusters. In can be understood that because the centroid of each cluster represents an estimation of the breathing rate associated with one person. The system can detect one or more breathing rates of one or more persons at the same time, based on the centroid of each cluster.

MUSIC-Based Breathing Estimation without Machine Learning

Figure 5:
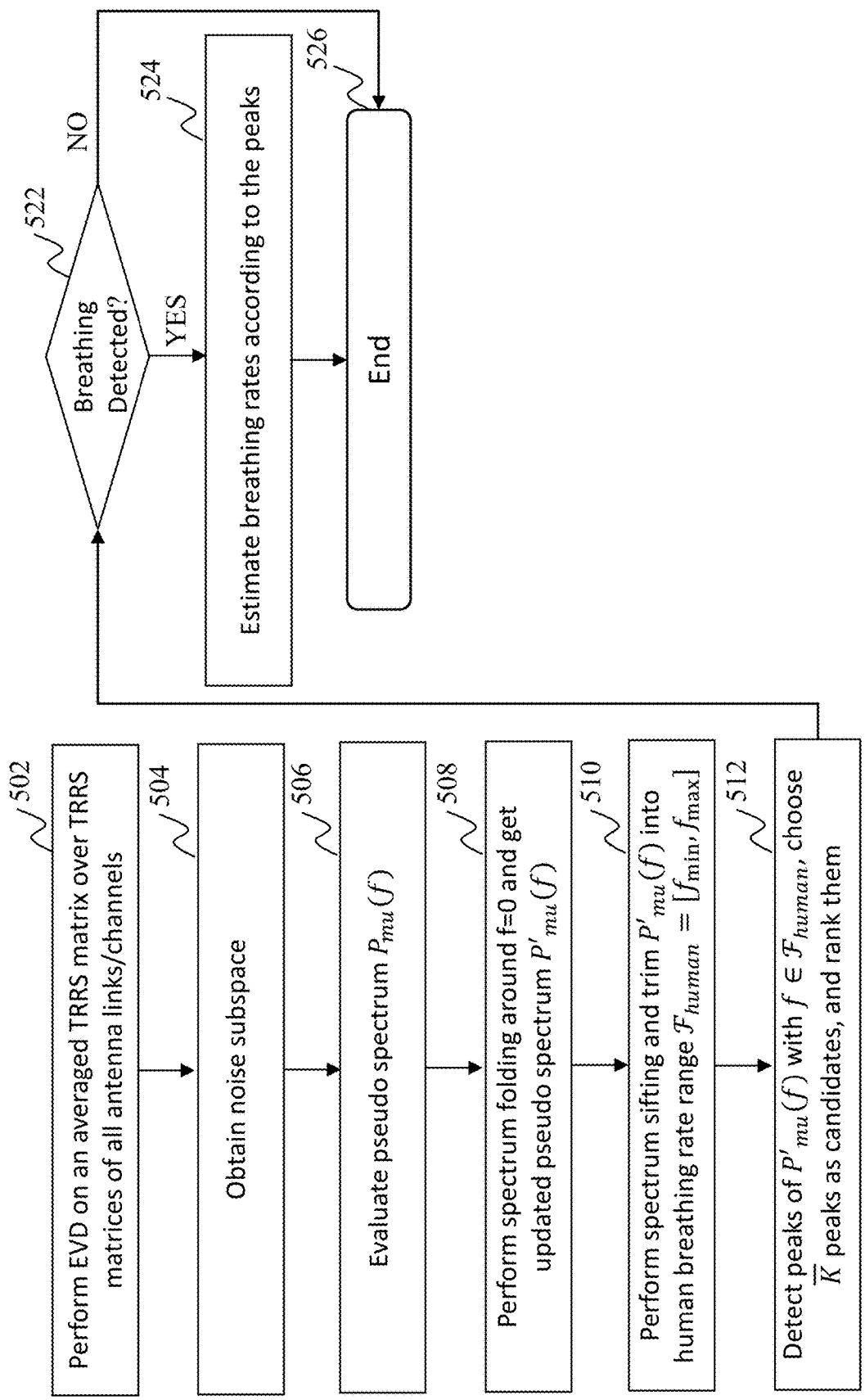
FIG. 5 shows an exemplary process for breathing detection and monitoring using a MUSIC algorithm without machine learning, according to an embodiment of the present teaching.

FIG. 5 shows an exemplary process for breathing detection and monitoring using a MUSIC algorithm without machine learning, according to an embodiment of the present teaching. An algorithm using machine learning can make the system computationally mor expensive, especially for the application which needs local computations using low-end embedded devices, than an algorithm without need of machine learning. For the algorithm without need of machine learning, one may avoid the situation of multiple TRRS matrix R, i.e., due to the presence of multiple antenna links and/or multiple channels. For each link or channel $i$, one can calculate the TRRS matrix $R_i$. Then, one may take average of these TRRS matrix as $$\bar{R} = \frac{1}{D}\sum_{i=1}^{D} R_i \tag{29}$$

The rest steps an be identical to the steps of the breathing rate estimation algorithm with machine learning. Since there is only one pseudo-spectrum $P_{mu}(f)$ calculated from $\bar{R}$, no further procedures, like steps related to machine learning, are needed.

As shown in FIG. 5, EVD is performed at 502 on an averaged TRRS matrix over TRRS matrices of all antenna links/channels, where each TRRS matrix was obtained based on CSIs extracted from received wireless signals that may be impacted by breathing of one or more persons, through a wireless link/channel. Noise subspace is obtained at 504. Pseudo spectrum, e.g. $P_{mu}(f)$, may be evaluated at 506. Spectrum folding around f=0 is performed at 508 to get updated pseudo spectrum $P'_{mu}(f)$. Spectrum sifting is performed at 510 and $P'_{mu}(f)$ is trimmed into human breathing rate range $\mathcal{F}_{human}=[f_{min}, f_{max}]$. Peaks of $P'_{mu}(f)$ are detected at 512 with $f \in \mathcal{F}_{human}$, and $\bar{K}$ peaks are chosen and ranked as candidates at 512 as well. At 522, it is determined whether breathing is detected, e.g. based on breathing rate candidates determined at 512. If breathing is detected at 522, then breathing rates may be estimated at 524 according to the peaks detected at 512. The locations of the peaks in the MUSIC pseudo-spectrum may imply the estimated frequencies that are most likely to produce such a pseudo-spectrum. As such, these peak locations can be directly translated into frequencies indicating estimated breathing rates. Otherwise, if breathing is not detected at 522, the process may end at 526, or in some embodiments go back to 502 to start over.

Root-MUSIC-Based Breathing Estimation with Machine Learning

Figure 6:
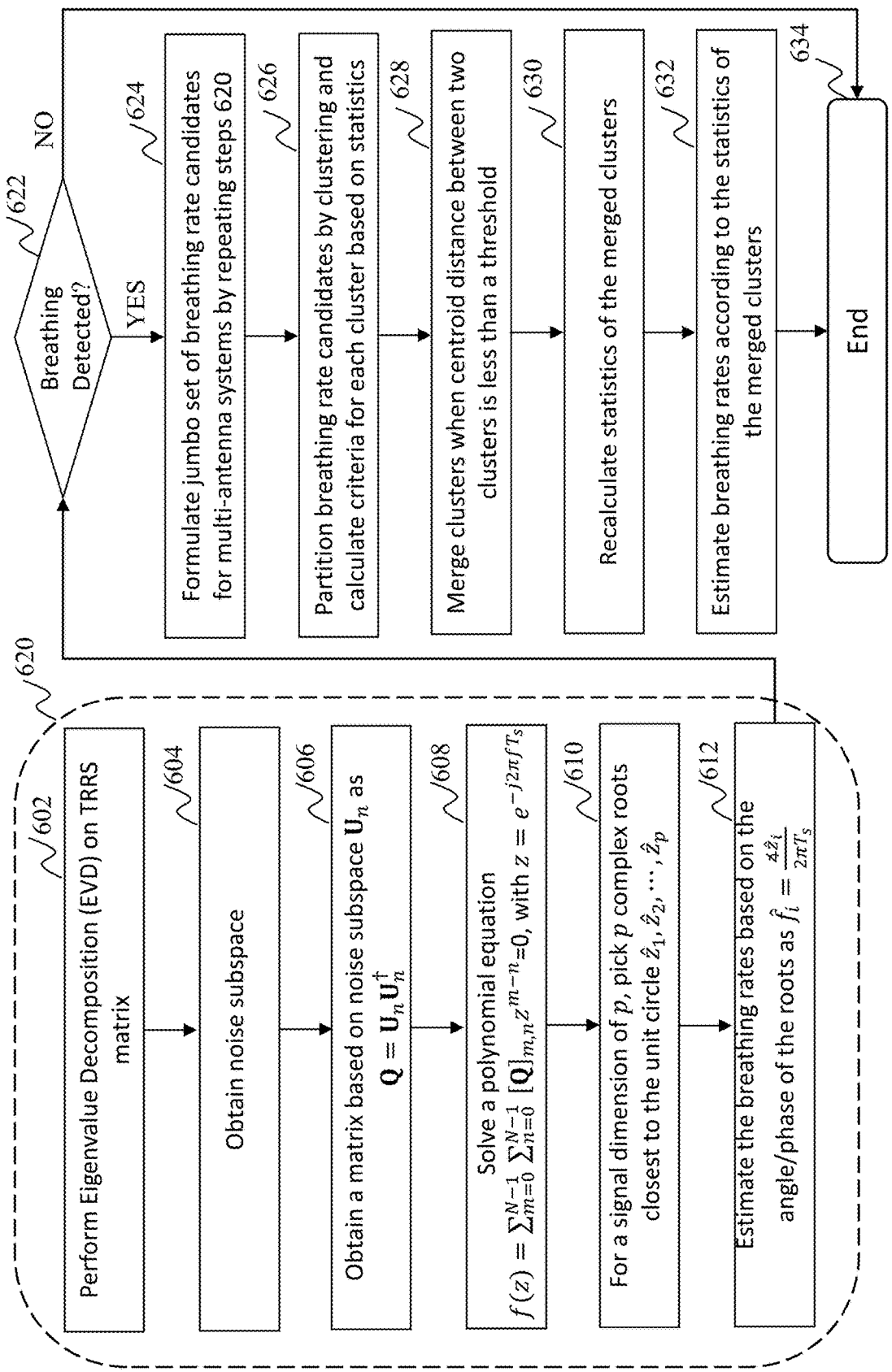
FIG. 6 shows an exemplary process for breathing detection and monitoring using a Root-MUSIC algorithm with machine learning, according to an embodiment of the present teaching.

FIG. 6 shows an exemplary process for breathing detection and monitoring using a Root-MUSIC algorithm with machine learning, according to an embodiment of the present teaching. In this case, one can first calculate the matrix $Q=U_n U_n^\dagger$. Then, one may formulate the polynomial given as $$f(z)=\sum_{m=0}^{N-1}\sum_{n=0}^{N-1}[Q]_{m,n}z^{m-n} \tag{30}$$

where $[Q]m,n$ is the (m, n)-th element of matrix Q, and $z=e^{-j2\pi f T_s}$. Since the polynomial in equation (30) is of order 2N–1, solving f(z)=0 in equation (30) can lead to 2N–1 complex roots. Discarding the trivial solution z=0, there are 2N–2 complex roots. Considering that Q is Hermitian, N–1 out of the 2N–2 complex roots are in the unit circle, while the rest N–1 complex roots are outside the unit circle. Since the N–1 complex roots inside the unit circle and the N–1 complex roots outside the unit circle are symmetric around the unit circle and can be paired, one may just consider the N–1 complex roots inside the unit circle. For a signal dimension of p, one can pick the p complex roots closest to the unit circle as long as $p \le N-1$, denoted as $\hat{z}_1, \hat{z}_2, \ldots, \hat{z}_p$. The breathing frequency estimation can be formulated as $$\hat{f}_i = \frac{\measuredangle \hat{z}_i}{2\pi T_s}, i = 1, 2, \ldots, p. \tag{31}$$

The following steps may be identical to the steps described previously for the breathing detection and monitoring using a MUSIC algorithm with machine learning.

Note that p can be an estimate on the maximum number of people. In case that one can solve f(z)=0 in equation (30), one may put an empty set into $\mathcal{N}_d$. Otherwise, one put the breathing rate estimations $\{\hat{f}_1, \hat{f}_2, \ldots, \hat{f}_p\}$ into $\mathcal{S}_d$. Because the human breathing rates are limited to a certain range, say, $f_{min}$ to $f_{max}$, one can discard estimations in $\mathcal{S}_d$ if they are not in the range of $[f_{min}, f_{max}]$. After the breathing monitoring system processes all D links, it can calculate $\mathcal{S}$ as $\cup_{i=1}^{D} \mathcal{S}_d$ and $\mathcal{N}$ as $\cup_{i=1}^{D} \mathcal{N}_d$, where U denotes the union operator.

As shown in FIG. 6, EVD is performed at 602 on a TRRS matrix that is obtained based on CSIs, where the CSIs may be extracted from received wireless signals that may be impacted by breathings of one or more persons. Noise subspace is obtained at 604. A matrix is obtained at 606 based on noise subspace $U_n$ as $Q=U_n U_n^\dagger$. A polynomial equation may be solved at 608, e.g. the equation $f(z)=\sum_{m=0}^{N-1}\sum_{n=0}^{N-1}[Q]_{m,n}z^{m-n}=0$, with $z=e^{-j2\pi f T_s}$. For a signal dimension of p, p complex roots closest to the unit circle $\hat{z}_1, \hat{z}_2, \ldots, \hat{z}_p$ is picked at 610. At 612, the breathing rates are estimated based on the angle/phase of the roots as $$\hat{f}_i = \frac{\measuredangle \hat{z}_i}{2\pi T_s}.$$

It can be understood that the steps 602-612, referred together as 620, may be repeated for each transmitter-receiver antenna link, e.g. for a multi-antenna system.

At 622, it is determined whether breathing is detected, e.g. based on breathing rate candidates determined at 612. If breathing is detected at 622, then a jumbo set of breathing rate candidates may be formulated at 624 for a multi-antenna system by repeating the steps 620, then the process moves on to 626. Otherwise, if breathing is not detected at 622, the process may end at 634, or in some embodiments go back to 602 to start over.

Breathing rate candidates are partitioned at 626 by clustering, and criteria are calculated for each cluster based on statistics. Clusters are merged at 628 when centroid distance between two clusters is less than a threshold. Statistics of the merged clusters are recalculated at 630. Breathing rates are estimated at 632 according to the statistics of the merged clusters. For example, as shown in FIG. 7, clusters are assigned with likelihoods, which can be used as statistics leading to estimated breathing rates.

Figure 8A:
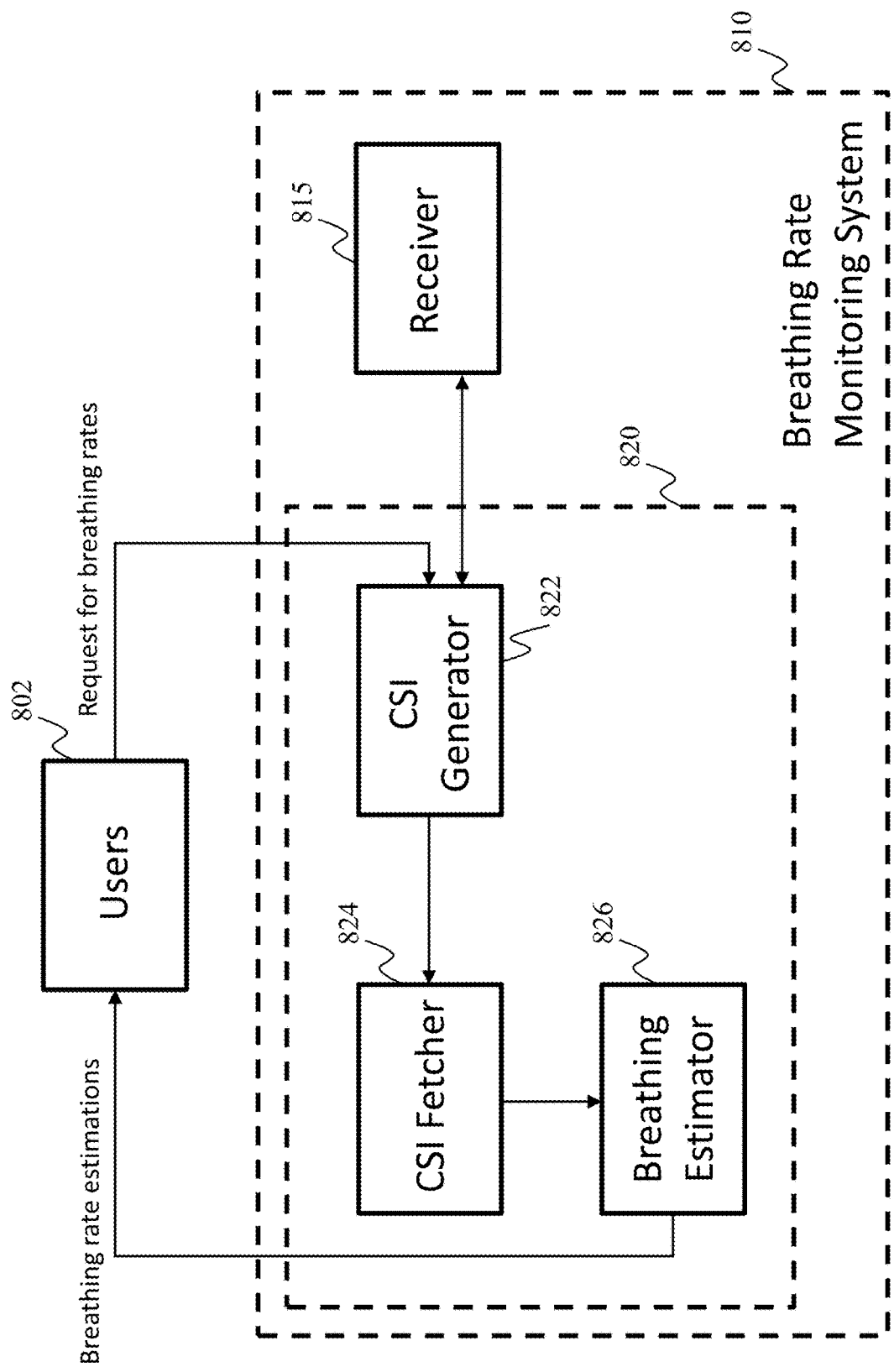
FIG. 8A shows an exemplary diagram of general implementation of a breathing monitoring system, according to an embodiment of the present teaching.

FIG. 8A shows an exemplary diagram of general implementation of a breathing rate monitoring system, according to an embodiment of the present teaching. As shown in FIG. 8A, users 802 may communicate with a breathing rate monitoring system 810. The breathing rate monitoring system 810 in this example includes a receiver 815, a CSI generator 822, a CSI fetcher 824, and a breathing estimator 826.

The CSI generator 822 in this example may receive a request from the users 802. In one embodiment, as shown in FIG. 8A, the request is for estimation of breathing rates of one or more persons. In another embodiment, the request may be for determination of presence of breathing, or any vital sign of a person. In yet another embodiment, the request may be for determination of a quantity of people in a particular area.

The CSI generator 822 may generate CSI based on the request. In one embodiment, the CSI generator 822 may obtain wireless signals received by the receiver 815 via the multipath channel that may be impacted by breathing of one or more persons. Based on the received wireless signals, the CSI generator 822 may generate CSIs that represent information of a profile of the multipath channel which may be embedded with breathing information of the one or more persons. The CSI generator 822 may send the generated CSIs to the CSI fetcher 824. In one embodiment, the breathing rate monitoring system 810 may also include one or more transmitters configured to transmit wireless signals via the multipath channel.

The CSI fetcher 824 in this example may be configured for receiving wireless signals transmitted via a multipath environment on multiple antennas and extracting the channel profiles based on the received signals. The breathing estimator 826 in this example may be configured for resolving multiple breathing rates given the extracted channel profiles, providing the breathing rate estimations to the users in response to the request.

Figure 8B:
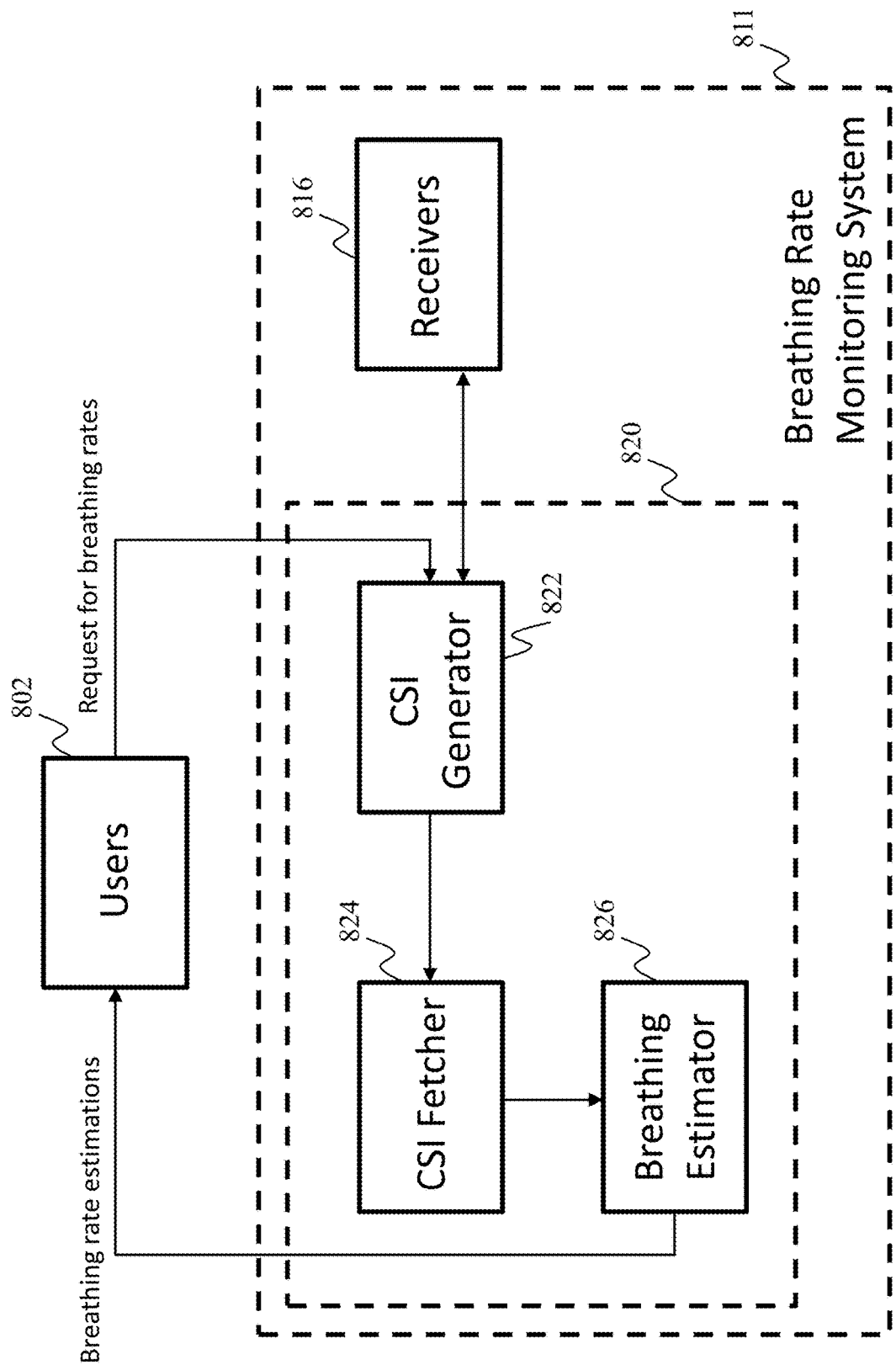
FIG. 8B shows an exemplary diagram of general implementation of another breathing rate monitoring system, according to an embodiment of the present teaching.

FIG. 8B shows an exemplary diagram of general implementation of another breathing rate monitoring system 811, according to an embodiment of the present teaching. As shown in FIG. 8B, the receiver 815 may be replaced by a plurality of receivers 816 to make use of technology of multiple antennas. CSIs from multiple antennas, e.g. from the plurality of receivers, can be combined or fused using various methods such as those disclosed in PCT/US2017/015909 and PCT/US2016/066015.

In one embodiment, as shown in FIG. 8A and FIG. 8B, the CSI generator 822, the CSI fetcher 824, and the breathing estimator 826 may all be implemented on a processor 820. In addition, each of the breathing rate monitoring systems 810, 811 may include a memory communicatively coupled with the processor 820.

Breathing Detection

The disclosed system, with various algorithms disclosed above, can also be used for breathing detection, that is, to detect if there are breathing humans located in the vicinity of the wireless transmission and reception devices.

In one embodiment, the process for breathing detection using a MUSIC-based method may comprise the following steps. When there is no breathing, the disclosed MUSIC-based methods would not produce any estimation in general due to insignificant peaks in terms of the chosen criterion in the pseudo-spectrum. On the other hand, when there is breathing, the disclosed MUSIC-based schemes would generate estimations satisfying the chosen criterion.

In another embodiment, the process for breathing detection using a Root-MUSIC-based method may comprise the following steps. When there is no breathing, the disclosed Root-MUSIC-based method would not produce many roots, i.e., the polynomial cannot be solved under most circumstances, and when the polynomial is solvable under this case, the number of roots would be small in general. On the contrary, when there is breathing, the polynomial can be solved to lead to many estimated values.

For the MUSIC-based schemes, one may set a threshold on the chosen criterion to detect the breathing. For the Root-MUSIC-based schemes, the system can calculate two metrics $\alpha$ and $\beta$, where $\alpha$ stands for a likelihood that the polynomial cannot be solved, while $\beta$ stands for a richness of the roots calculated as the ratio between the number of obtained roots to the total number of possible roots.

An example of breathing detection is discussed as below. Extensive experiments showed that statistics of $\mathcal{S}$ and $\mathcal{N}$ can be indicators of the presence or absence of breathing. In the absence of breathing, it is highly possible that the polynomial of Root-MUSIC in equation (30) does not yield any breathing rate estimation in the range $[f_{min}, f_{max}]$, which leads to a large $\mathcal{N}$ and a small $\mathcal{S}$ in terms of cardinalities, i.e., the number of elements in the two sets. In the presence of breathing, solving equation (30) could produce many breathing rate estimations and lead to a small $\mathcal{N}$ and a large $\mathcal{S}$.

The breathing monitoring system leverages such observations for breathing detection.

First of all, the system formulates the $\alpha$ and $\beta$ statistics given by $$\alpha = \frac{|\mathcal{N}|}{|\mathcal{S}|+|\mathcal{N}|}, \beta = \frac{|\mathcal{S}|}{pVD}.$$

where the denominator of $\beta$ is the total number of possible breathing rate estimations for V time windows, D links, p estimations per link per time window, and $|\cdot|$ denotes the cardinality of a set, $\alpha$ indicates the insolvability of equation (30), while $\beta$ indicates the diversity of solutions in solving equation (30).

The correlation between $\theta=(\alpha, \beta)$ and the existence of breathing is utilized to train the logistic regression binary classifier, if the ground-truth label y associated with $\theta$ is also available, with y=1 representing the presence of breathing and 0 otherwise. Since the disclosed breathing monitoring system is designed to be an autonomous system, it may have no access to the ground-truth label.

To learn the label y automatically from $\theta$, the system can develop an unsupervised learning scheme. For example, the system may run for T times and produce $\theta_1, \theta_2, \ldots, \theta_T$. Then, the labels associated with $\theta$ can be determined by the following two steps: (i) perform k-means clustering on $\theta_1, \theta_2, \ldots, \theta_T$ with k=2; and (ii) select, out of the 2 clusters generated by k-means, the one with the larger averaged $\alpha$ value and label all members within that cluster with 1. Meanwhile, label all members within the other cluster with 0.

The labels $\{\hat{y}_i\}_{i=1,2,\ldots,T}$ can then be fed into a logistic regression model together with $\{\theta_i\}_{i=1,2,\ldots,T}$ for learning the parameters $\omega_c$, $\omega_\alpha$, $\omega_\beta$ of the sigmoid function $$f(\alpha, \beta) = \frac{1}{1 + \exp(-\omega_c - \omega_\alpha \alpha - \omega_\beta \beta)}$$

using gradient descent. After the training is done, given any unseen $\theta = (\alpha, \beta)$, the breathing monitoring system can decide that breathing exists if $f(\alpha, \beta) > \kappa$ and that breathing does not exist otherwise, where $\kappa$ is a predetermined threshold.

People Counting Based on Breathing

Based on the breathing detection and breathing rate monitoring, the system can also count the number of people detected. For the MUSIC-based scheme, the system can count the number of significant peaks in the pseudo-spectrum based on some certain criterion. Then, the number of significant peaks may indicate the number of people having detected breathing. For the Root-MUSIC-based scheme, the system can count the number of clusters with high likelihoods compared to a certain threshold on the likelihood.

For example, in case that the number of people is unknown, the disclosed system can be used to estimate how many individuals are in the vicinity of the wireless devices. The disclosed system may use the likelihood of each cluster after merging clusters to formulate an estimation of K given by $$\hat{K} = \arg\min_j [\Sigma_{i=1}^{\min(\bar{K},j)} \bar{l}_i \geq \lambda], \tag{32}$$

where $\bar{l}_i$ is the likelihood of cluster i after merging, and $\lambda$ is the threshold on the cumulative likelihood. Then, the system can output $K_o = \hat{K}$ breathing estimations with the highest likelihoods. Here, $K_o$ stands for an estimated number of people who breathed in the coverage area of the disclosed system.

Estimating Breathing Strength and Geometric Extraction of Breathing

In addition to the breathing rate estimations, the strength of breathing can also be an important indicator of medical conditions. For example, fast and shallow breathing can be an indicator of Tachypnea, an abnormal breathing caused by fever, fear, and other factors. Meanwhile, it is useful to know the source location of the breathing signal, e.g., geometric extraction to infer the position of the people under monitoring. This could be helpful in a scenario of two people breathing with identical breathing rates, since they may not be located at the same position and thus can be potentially distinguished from each other by different locations.

Assume that perfect background subtraction can be achieved as shown in (17) and further assume that the noise can be ignored. Then, the amplitude and phase of $\bar{H}_k(t)$ can be written as $$|\bar{H}_k(t)| = 2|\alpha_1||J_1(v_k)\sin(2\pi f t + \phi)| \tag{33}$$

and the phase is given as $$\angle \bar{H}_k(t) = -\frac{\pi}{2} + \angle \alpha_1 - \frac{2\pi d_1}{\lambda_k} \tag{34}$$

Both the amplitude and phase are functions of the subcarrier index k. One can observe that: the amplitude $|\bar{H}_k(t)|$ changes periodically with the breathing frequency f across time t; the amplitude $|\bar{H}_k(t)|$ almost changes periodically with the subcarrier index k given a fixed time t; the phase $\angle \bar{H}_k(t)$ contains crucial information about the path delay $d_1$. Here, the periodic means the zero-crossing points show a periodic pattern. This is due to the fact that the zero-crossing points of the Bessel function $J_1(x)$ are nearly periodic with the argument x.

Estimating the Effective Breathing Strength

Based on the periodicity of $|\bar{H}_k(t)|$, the system can estimate the effective breathing strength $\overline{\Delta d_1}$, given as $$\overline{\Delta d_1} = \Delta d \sin \theta. \tag{35}$$

This may include estimating the period of $|\bar{H}_k(t)|$ for each fixed t over the subcarriers k, say, $\hat{T}$, and estimating $\overline{\Delta d_1}(t)$. First, the zero-crossing period of $|\bar{H}_k(t)|$ may be estimated for each fixed t over the subcarriers k, denoted as $\hat{T}$. For instance, if $|\bar{H}_k(t)|$ crosses zero for every 5 subcarriers, then the system can determine that $\hat{T} = 5$. The $\overline{\Delta d_1}(t)$ may be estimated as $$\overline{\Delta d_1}(t) = \frac{cNT_s}{2\hat{T}}, \tag{36}$$

where c is the speed of light, N is the size of FFT which is 128 for 40 MHz and 64 for 20 MHz, $T_s$ is the sampling interval which is 25 ns for 40 MHz and 50 ns for 20 MHz. The same operation can be repeated for all time instances t.

Estimating the Geometric Information About Breathing

From $\angle \bar{H}_k(t)$, the system can estimate $d_1$ which is related to the position of the person under monitoring. For instance, if the system estimates $d_1$ as 3 meters, then, the person under monitoring may be significantly affecting a multipath component with length of 3 meters. In other words, the person is very close to the wireless transmission pairs of the disclosed system.

To estimate $d_1$, one can realize that $\angle \bar{H}_k(t)$ is linear in terms of the subcarrier index k. In reality, the phase noise always exists, and $\angle \bar{H}_k(t)$ equals to $Sk + \zeta + e(k)$ where $e(k)$ is the phase noise on subcarrier k. In this case, least-square estimation can be used to estimate the slope of $\angle \bar{H}_k(t)$ for a given t over all subcarriers.

This can be seen by rewriting $\angle \bar{H}_k(t)$ as $$\angle \bar{H}_k(t) = -\frac{\pi}{2} + \angle \alpha_1 - \frac{2\pi d_1\left(f_c + \frac{k}{NT_s}\right)}{c} = Sk + \zeta \tag{37}$$

where $$S = -\frac{2\pi d_1}{cNT_s}$$

is the slope of $\angle \bar{H}_k(t)$, and $\zeta$ is the interception. Then, one can write $\angle \bar{H}_k(t)$ for a fixed t over all subcarriers into a K×1 column vector h where K is the number of usable subcarriers, to obtain $$h = A[S\zeta]^T + e \tag{38}$$

where $A=[k_1 \ k_2 \ldots k_K; 1 \ 1 \ldots 1]^T$ is a K×2 matrix with $k_i$ representing i-th subcarrier index, and e is a K×1 column vector representing the phase error. Then, [S ζ] can be estimated as $$[\hat{S}\hat{\zeta}]^T = (A^T A)^{-1} A^T h \tag{39}$$

When the slope is estimated as $\hat{S}$, $d_1$ can be obtained as $$\hat{d}_1(t) = -\frac{1}{2\pi} \hat{S} c N T_s \tag{40}$$

The same operation can be repeated for all time instances t to formulate a time series of the estimated path delays affected by the breathing the most.

The estimation of effective breathing strength and the extraction of geometric information about breathing can also be extended to multi-person breathing scenario.

Dealing with Missing Packets

During practical utilization of radio signals from commercial chips, e.g., from a Wi-Fi system, packet missing may be inevitable due to the following reasons. First, there may be large RF interference from nearby wireless systems, e.g., another Wi-Fi network running on the same center frequency. Second, the access point capturing CSIs may also be in charge of providing internet access to associated users. When users are occupying a large bandwidth continuously, the packet loss rate would increase significantly, e.g., when the users are watching high-definition online movies. Third, there are multiple Wi-Fi stations associated with the access point capturing CSIs, which formulates an uplink scheme. The Wi-Fi stations would compete with each other to send sounding packets to the same access point, which can incur packet loss.

Due to the packet loss, the received CSI timestamps at the access point side cannot be considered as uniform, which happens to be a fundamental assumption in most spectrum analyzers, i.e., MUSIC and Root-MUSIC. It can be expected that when the packet loss is significant enough, the MUSIC and Root-MUSIC algorithm would deteriorate greatly.

To solve this issue, the system can consider the following problem. After the system receives M CSIs, N of them are missing, where $\mathcal{T}' = \{t'_1, t'_2, \ldots, t'_N\}$ denotes the set containing the sequence number of the missing CSI packets, and $\mathcal{T} = \{t_1, t_2, \ldots, t_{N+M}\}$ denotes the full time index if there is no packet loss at all. Then, the remaining time index under which the M CSIs are received is $\overline{\mathcal{T}} = \mathcal{T}/\mathcal{T}'$, where / stands for the set difference operator.

In practice, $\overline{\mathcal{T}}$ is known at the Wi-Fi receiver. Then, one could reconstruct the set $\mathcal{T}$ as $\{\min\overline{\mathcal{T}}, \min\overline{\mathcal{T}}+1, \min\overline{\mathcal{T}}+2, \ldots, \max\overline{\mathcal{T}}-1, \max\overline{\mathcal{T}}\}$, where $\min\overline{\mathcal{T}}$ is the minimum value of the sequence number set $\overline{\mathcal{T}}$ while $\max\overline{\mathcal{T}}$ is the maximum value of the sequence number set $\overline{\mathcal{T}}$. Therefore, the missing index set $\mathcal{T}'$ can be reconstructed as $\mathcal{T}/\overline{\mathcal{T}}$.

Then, given N CSIs captured with sequence numbers indicated by $\overline{\mathcal{T}}$, the system can calculate the N×N TRRS matrix R using the background-subtracted CSIs $\overline{\mathbb{H}}$, where each column of $\overline{\mathbb{H}}$ representing a snapshot of a CSI vector $\overline{H}(t) = [\overline{H}_1(t) \overline{H}_2 \ldots \overline{H}_K(t)]^T$. More specifically, the (i, j)-th entry of R is given as $\gamma[\overline{H}(t_i), \overline{H}(t_j)]$, where $\gamma[\bullet,\bullet]$ is the TRRS operator. Then, for subspace-based analysis such as MUSIC and/or Root-MUSIC, one can perform EVD on R which leads to $$R = U \wedge U^\dagger, \tag{41}$$

where U is an N×N orthornormal matrix, ∧ is an N×N diagonal matrix with diagonal entries representing all of the eigenvalues of R, and † stands for the conjugate-transpose operator. In reality, due to the existence of channel noise, R is full rank, and thus U and ∧ is also full rank. Therefore, the columns of U span the entire space, with some of them being in the signal subspace and the rest being in the noise subspace. When the signal subspace is p, and the columns of U are sorted based on the descending order of the eigenvalues on the diagonal of ∧, the first p columns of U span the signal subspace and the rest N−p columns of U span the noise subspace.

Then, the system can incorporate the knowledge of $\mathcal{T}'$ before proceeding based on the following procedure: first, construct the extended (N+M)×(N+M) all-zero eigenmatrix U'; then let $U'_{\overline{\mathcal{T}}_i, \overline{\mathcal{T}}_j} = U_{i,j}$, where $\overline{\mathcal{T}}_i$ represents the i-th element of $\overline{\mathcal{T}}$. Now, one can obtain the interpolated signal and noise eigenspace $U'_s$ and $U'_n$ respectively by taking the first p and last N+M−p columns of U'. Following similar steps disclosed in MUSIC/Root-MUSIC with machine learning, the system can perform breathing monitoring when there are missing packets.

Smoothing of the TRRS Matrix R

The calculation of R may be based on the N snapshots of CSIs. To improve the accuracy of the MUSIC and Root-MUSIC algorithms, the system can perform temporal smoothing on the TRRS matrix R, which leads to the extended TRRS matrix $\overline{R}$. The detail of the algorithm is discussed below.

Given the knowledge of the sequence number $\mathcal{T}$, the system can construct the extended (N+M)×(N+M) all-zero matrix $\overline{R}$. Let $\overline{R}_{\overline{\mathcal{T}}_i, \overline{\mathcal{T}}_j} = R_{i,j}$, where $\overline{\mathcal{T}}_i$ represents the i-th element of $\overline{\mathcal{T}}$. Meanwhile, the system can construct a counting matrix C based on the extended matrix $\overline{R}$. The entry of C is given as below:

$$[C]_{i,j} = \begin{cases} 1, & [R]_{i,j} \neq 0 \\ 0, & \text{Otherwise} \end{cases} \tag{42}$$

Given a smoothing parameter $N' \neq (N+M)$, i.e., number of snapshots for each submatrix, one can construct a total of N+M−N' submatrix denoted by $\overline{R}_i$, i=1, 2, . . . , N+M−N'. The i-th N'×N' submatrix $\overline{R}_i$ contains the entries of $\overline{R}$ with row index in the range of [i−1, i+N'−1] and column index in the range of [i−1, i+N'−1] as well. The system may construct the submatrix for the counting matrix C in a similar way, written as $C_i$. Accumulating $\overline{R}_i$ and $C_i$ over i, one can get the smoothed N'×N' matrix $\underline{R} = \sum_{i=1}^{N+M-N'} \overline{R}_i$ as well as the N'×N' smoothed counting matrix $\underline{C} = \sum_{i=1}^{N+M-N'} C_i$. To further improve the result, the system can use a forward-backward smoothing, leading to the improved N'×N' matrix $\underline{R}'$ given by $$\underline{R}' = \frac{1}{2}(\underline{R} + J\underline{R}^+ J), \tag{43}$$

and the improved N'×N' counting matrix $\underline{C}'$ as $$\underline{C}' = \frac{1}{2}(\underline{C} + J\underline{C}J), \tag{44}$$

where J is a N'×N' permutation matrix with unity entries on the anti-diagonal.

For instance, a 2×2 permutation matrix is:

$$J = \begin{bmatrix} 0 & 1 \\ 1 & 0 \end{bmatrix} \quad (45)$$

For matrix $\underline{R}'$ and $\underline{C}'$, one can delete the rows and columns in $\underline{R}'$ and $\underline{C}'$ where at least one entry of that row or column is zero, leading to a N"×N" matrix $\underline{\overline{R}}$ and $\underline{\overline{C}}$ where N"≤N'. The system can then obtain the temporal smoothed N"×N" matrix $R_{sm}$, with entries given by $$[R_{sm}]_{i,j} = \frac{\{\underline{\overline{R}}\}_{i,j}}{\{\underline{\overline{C}}\}_{i,j}} \quad (46)$$

As long as $R_{sm}$ is non-empty, it can be used for the analysis using MUSIC and/or Root-MUSIC. On the other hand, if $R_{sm}$ is empty, then it may indicate that smoothing cannot be performed successfully. This can be due to the missing of a majority of Wi-Fi packets, say, 60%.

Figure 9:
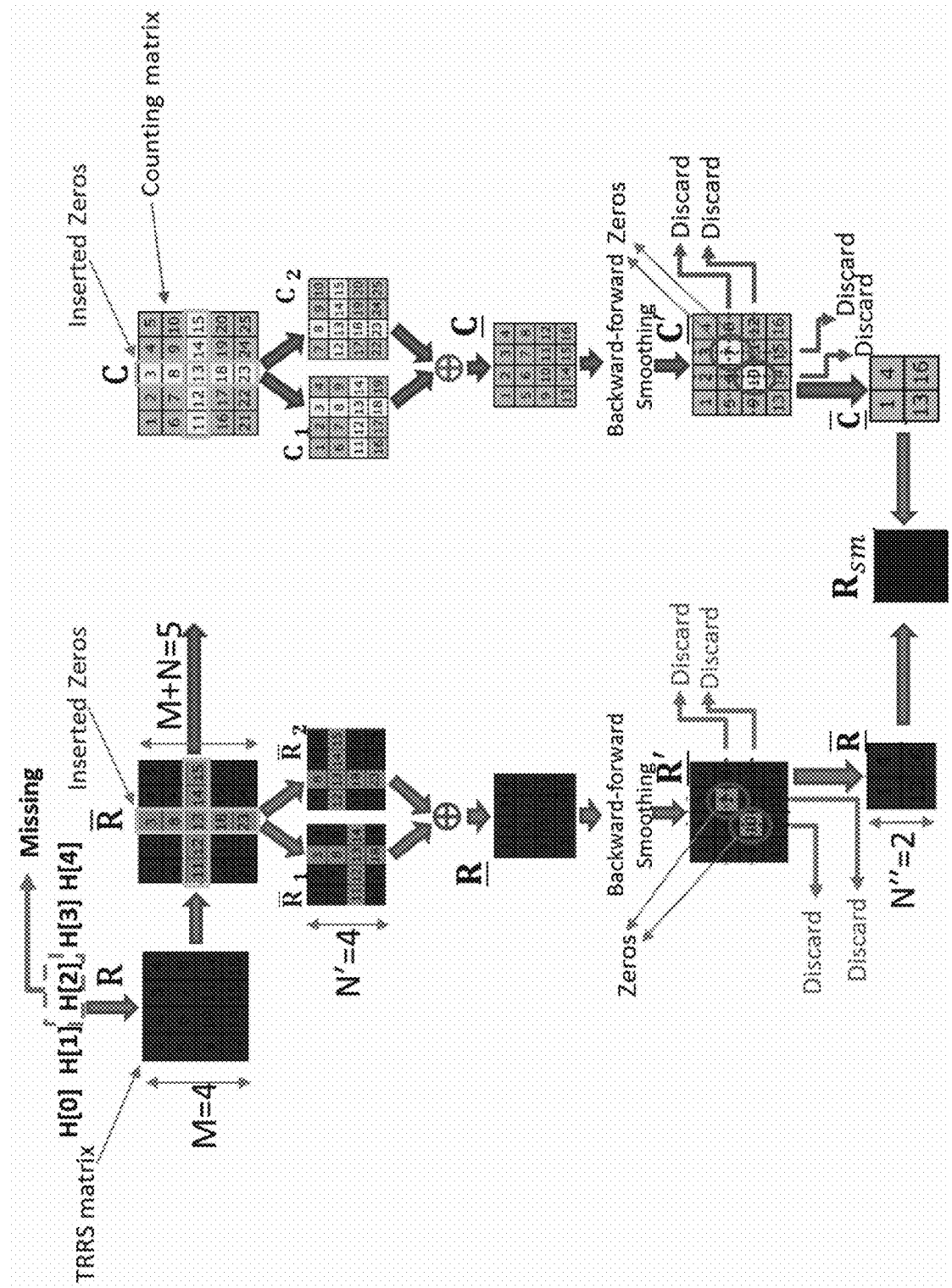
FIG. 9 shows an exemplary process for temporal smoothing, according to an embodiment of the present teaching.

FIG. 9 shows an exemplary process for temporal smoothing, according to an embodiment of the present teaching, where a total of 4 CSIs with one missing CSI is assumed. The TRRS matrix R is formulated first, then, zeros are inserted into R to construct the extended TRRS matrix $\overline{R}$. From $\overline{R}$, the disclosed system further formulates submatrix, denoted as $\overline{R}_1$, $\overline{R}_2$, $C_1$ and $C_2$, respectively. The submatrix are accumulated to produce $\underline{R}$ and $\underline{C}$, which are further processed by backward-forward smoothing which yields $\underline{R}'$ and $\underline{C}'$. Finally, $R_{sm}$ is calculated based on $\underline{R}'$ and $\underline{C}'$.

The steps disclosed above for smoothing of the TRRS matrix can further improve the performance of breathing monitoring if there are missing packets, when combined with the steps disclosed above for dealing with missing packets.

Breathing Estimation with Projection (Geometric Embedding)

In some situations, one may want to investigate breathing only for a certain multipath component with a specific path length/delay. For instance, knowing two persons in two positions with very distinct path delays, by projecting the CSI according to the two distinct path delays, the system can separate the two persons' breathing monitoring, even if their breathing rates may be close.

To implement this feature, the system can perform spatial filtering on the snapshots of CSIs. Given a background subtracted CSI snapshot $\overline{H}(t)$, the system can project $\overline{H}(t)$ into $\dot{H}_d(t)$ with path delay d expressed as $$\dot{H}_d(t) = s_d^\dagger \overline{H}(t), \quad (47)$$

where $s_d = [1 \ e^{-j2\pi d/\lambda_k} \ e^{-j4\pi d/\lambda_k} \ldots e^{-j2(K-1)\pi d/\lambda_k}]$, i.e., the steering vector with a path length d. Then, the system can calculate the TRRS matrix R and its smoothed version $R_{sm}$ based upon the projected CSI time series $\dot{H}_d(t)$ and the smoothing technique introduced in the present teaching. After that, breathing rates can be estimated using MUSIC and/or Root-MUSIC analysis.

Impact of Motion on Breathing Monitoring

Unavoidably, the environment may be dynamic. In other words, besides the desirable component in the CSIs relevant to the vital signs, there may also exist other components in the CSIs that are irrelevant to the vital signs.

More specifically, the CSI model $H_k(t)$ defined in equation (9) may be dynamic in the sense that the signal component $S_k(t)$ changes with time t. However, the interference term $I_k$ is not a function of time t, representing a static environment except the dynamics imposed by the breathing. When there exists dynamics due to motions, equation (9) should be modified as $$H_k(t) = \Gamma_t(S_k(t) + I_k(t)e^{j(\alpha_t + \beta_t k)} + e_k(t), \quad (48)$$

where the interference caused by motion denoted by $I_k(t)$ also becomes a function of time t. Even after background subtraction disclosed in the present teaching, one could hardly mitigate the DC component of the motion interference $I_k(t)$ while leaving the other spectral components intact. The existence of motion interference would introduce both false alarms and miss detection.

For example, if some spectral components due to the motion interference $I_k(t)$ is very strong, say, $f_f$, then the disclosed system would generate some breathing rate estimations at $f_f$, which is in fact not caused by breathing but by some motions. This can increase false alarm.

For example, if some spectral components due to $I_k(t)$ overlaps with the breathing frequency f, then it is possible that the interference would cancel the spectral component at f, which leads to miss detection.

To tackle this issue, the system can perform motion detection to detect which CSI samples are affected by large motions instead of minor motions such as breathing, e.g. based on methods disclosed in patent application PCT/US2016/066015. Then, one can treat these CSI samples as if they are simply missing, and use the method dealing with missing packets doscloased earlier in the present teaching to estimate the breathing rates.

Distinguishing People with Close Breathing Rates

In reality, the breathing rates of different people could be very close to each other and thus makes the estimation very difficult. According to equation (7), the difference between two breathing rates may be more distinct for higher harmonics. For example, when there are two breathing rates $f_1$ and $f_2$ with $f_2 - f_1 = \Delta$, the difference for the second-order harmonic is $2\Delta$, which is two times the difference for the first-order harmonic. In this situation, the system can use the harmonics to distinguish two breathing rates very close to each other.

The power of the harmonic may decay rapidly with the order m. Thus, the high-order harmonics, i.e. harmonics with orders larger than one, could be too weak to be used for breathing rate estimation, when using geometric information to extract breathing rate. However, if knowing the rough path delays of the different positions where the people being monitored are at, the system can project the collected CSIs to those path delays and utilize breathing estimation method with projection disclosed earlier to estimate the breathing rates.

Use Cases

Human Detection and Monitoring

The disclosed breathing monitoring method can be used to detect the presence of human, since it is capable of breathing detection. This is useful for smart home applications as well as life detection in inaccessible areas, e.g., mines or wreckage. Another example is when an elevator has some emergency and gets trapped between two floors, if devices with the disclosed breathing monitoring function are pre-installed inside/around the elevator, the breathing of the people inside the elevator can be closely monitored. Yet another example is when some vehicle is about to leave a jail, cross a country border, or move around a crime scene, and the policemen need to check if there is any suspect inside the vehicle, the disclosed breathing monitoring device can be put in a proper position on/around the vehicle to detect whether there is indeed any suspect inside the vehicle. Yet another example is there may be lack of enough monitoring whether the prisoners are live or in good health condition especially during the night. The disclosed breathing monitoring device may also assist a prison to monitor their prisoners.

Counting the Number of People

The disclosed breathing monitoring devices can estimate the number of people around the deployed devices. Therefore, it could be used for crowd control applications, e.g., counting the number of people on the bus, in a room, etc.

Healthcare and Wellness

The disclosed breathing monitoring devices can be used to detect the abnormality of breathing for people. By tracking the variations in the breathing rates, doctors could diagnose the patients with richer information on his/her breathing pattern. For example, after background subtraction, the background-subtracted CSI can be checked and by pattern matching the CSIs' waveform with breathing patterns from some database, it can be found whether the patients have problems in their respiratory systems. Another example is by deploying the disclosed devices in an elder care center, or a nursery, or a home, the elder people/babies' health condition can be closely monitored.

The disclosed breathing monitoring can also be used for monitoring other vital signs that exhibits a periodically changing pattern. For instance, when the breathing monitoring devices operate in high-center frequency, e.g., in 60 GHz, they can also monitor human heartbeat. Similarly, the disclosed devices can be used for vital signs monitoring of animals such as animals in a zoo.

Alternative Approaches for Breathing Monitoring

Breathing incurs positional displacement of human chests which can change the path delays reflected by the chests, causing the phases of subcarriers on different antenna links also changing in accordance with breathing. Therefore, the phase changes can be utilized to track human breathing.

The disclosed breathing monitoring system could select the representative subcarrier on a specific antenna link to demonstrate the time-varying phase changes caused by breathing. For instance, the criterion of subcarrier selection can be (i) the variance of a subcarrier in a period of time; or (ii) the energy of the dominant spectral component within a period of time.

After selecting the representative subcarrier, by studying the periodically changing pattern of the CSI on that subcarrier, the breathing rate of a person can be estimated. For instance, the amplitude of the CSI on the representative subcarrier may exhibit a sinusoid-like pattern. Given a certain time period T0, by counting the number of zero-crossing points of the CSI amplitude, the system can know how many breathing cycles exist in the time period T0 and further estimate the breathing rate.

Other types of machine learning approaches can also be used for breathing estimation.

Experimental Results

Extensive experiments have been conducted to evaluate the performance of the disclosed monitoring system. The experiments are conducted in two different rooms in an office suite with dimensions 8 m×7 m and 8 m×5 m, respectively. One pair of prototypes equipped with off-the-shelf WiFi cards was built with 3 omnidirectional antennas to obtain CSIs. Thus, the total number of links D is 9. One of the prototypes works as the ORIGIN, while the other works as the BOT. The center frequency is configured in the 5.8 GHz Wi-Fi band with a bandwidth of 40 MHz. The transmit power is 20 dBm.

The performance was evaluated in both LOS and NLOS scenarios. For the LOS scenarios, the ORIGIN and the BOT are placed in the same room with the people, while for the NLOS scenarios, they are placed outside the room blocked by two walls. The locations of both Wi-Fi devices under both scenarios are marked in FIG. 10 and FIG. 11.

Figure 10:
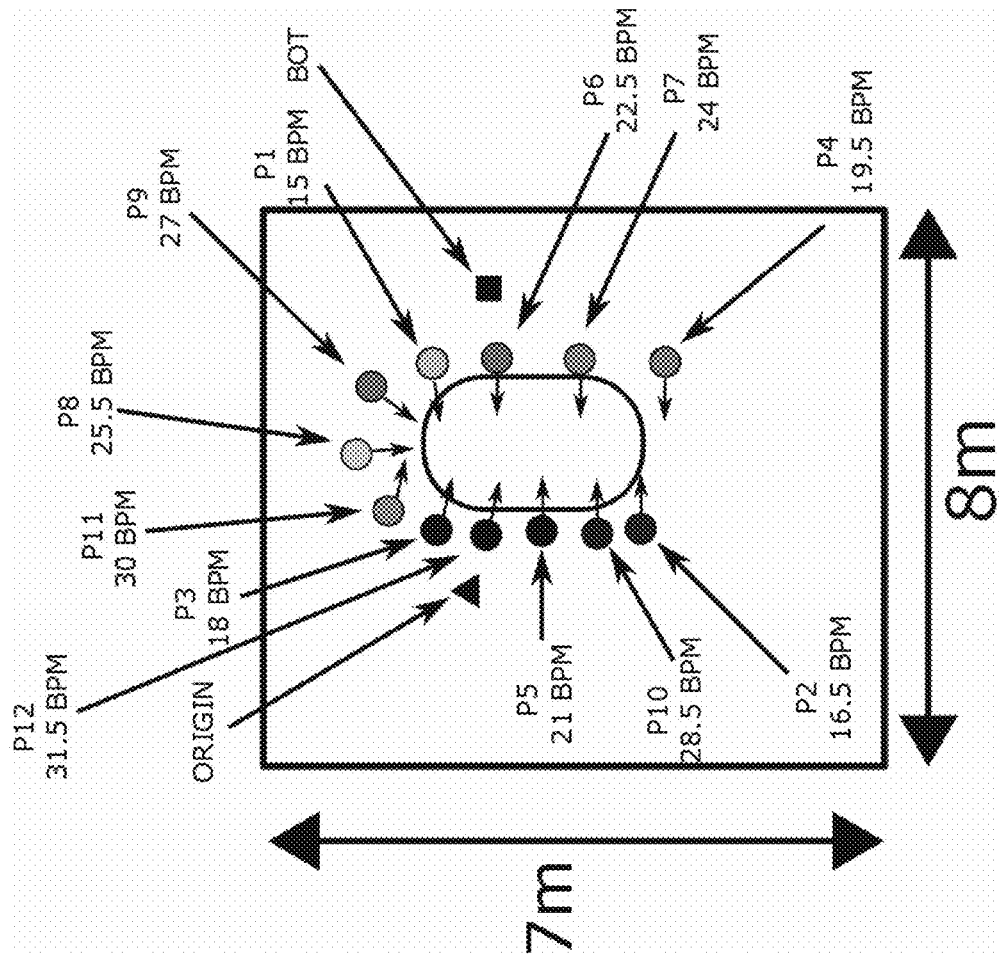
FIG. 10 shows an exemplary experimental setting for multi-person breathing monitoring under a line-of-sight scenario, according to an embodiment of the present teaching.

A total of 17 different participants were invited. During the experiments, slight movements, e.g., head or limb movements, were allowed. In FIG. 10, 12 people were seated in a conference room, while in FIG. 11, up to 7 people were seated in another room.

The performance of the proposed monitoring system is evaluated by comparing the breathing rate estimations against the ground-truths. To obtain the ground-truths, each participant was asked to synchronize his/her breathing according to a metronome application on his/her cellphone. After the controlled breathing experiments, one may conduct experiments in a more practical setting where the participants are asked to breathe naturally according to their personal habits and count their own breathing rates manually.

To assess the accuracy of breathing rate estimations, one can use a metric called accuracy which is defined as $$\text{Accuracy} = \left(1 - \sum_{i=1}^{K_o} \frac{|f_i - \hat{f}_i|}{f_i}\right) \times 100\% \tag{49}$$

where $K_o = \min(\overline{K}, K)$.

Figure 12:
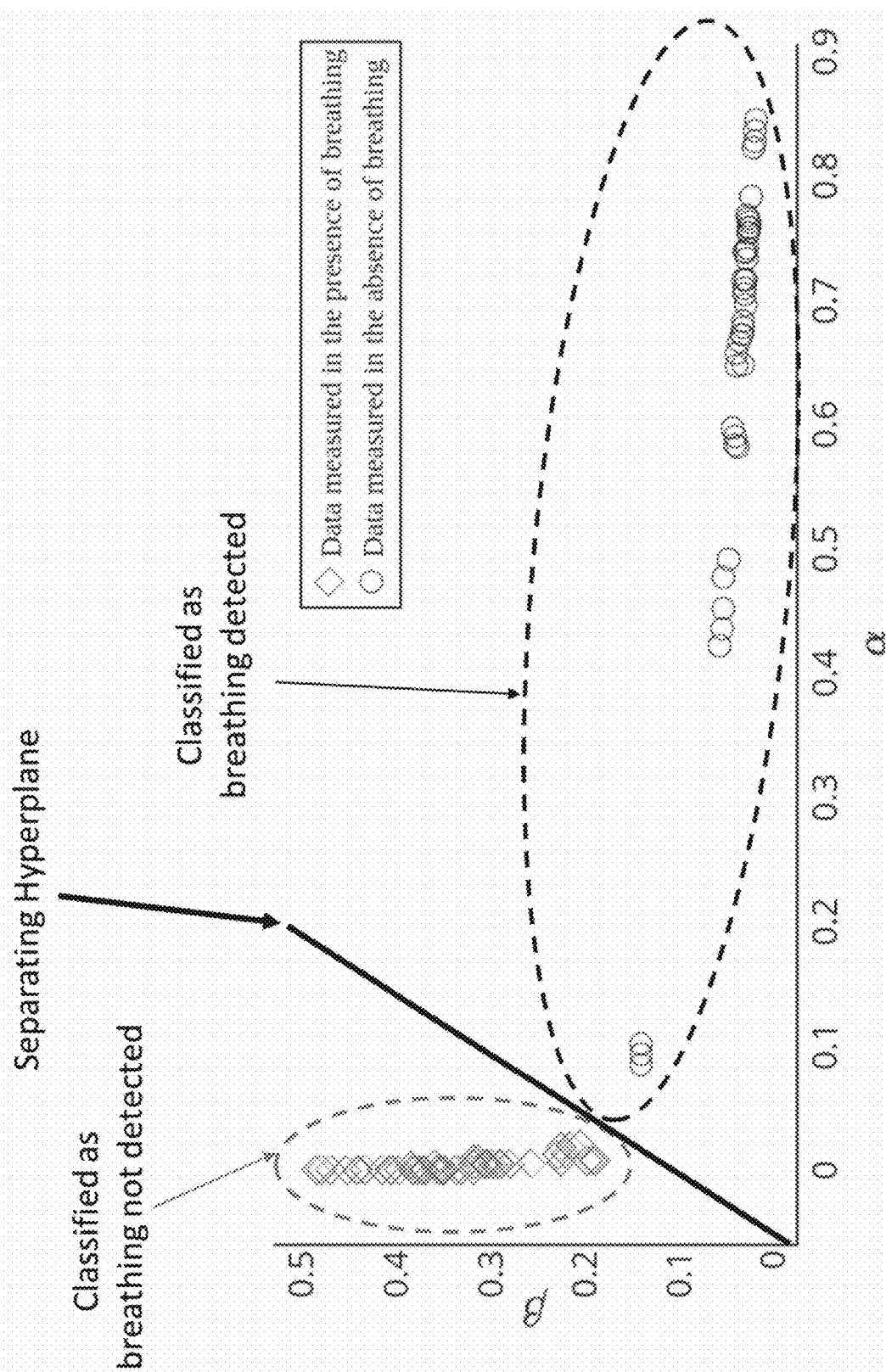
FIG. 12 shows results of an exemplary experiment for breathing detection using machine learning algorithm, according to an embodiment of the present teaching.

FIG. 12 demonstrates the breathing detection performance of the proposed system using SVM as the classifier. First of all, one can observe that the labels $\hat{y}$ can be inferred from $\theta = (\alpha, \beta)$ without errors. Secondly, one can observe that SVM returns a hyperplane that partitions $\theta = (\alpha, \beta)$ perfectly, implying a 100% detection rate. This is further validated by performing K-fold cross-validation on the results, leading to a 100% detection without false alarm for each cross-validation.

Figure 13:
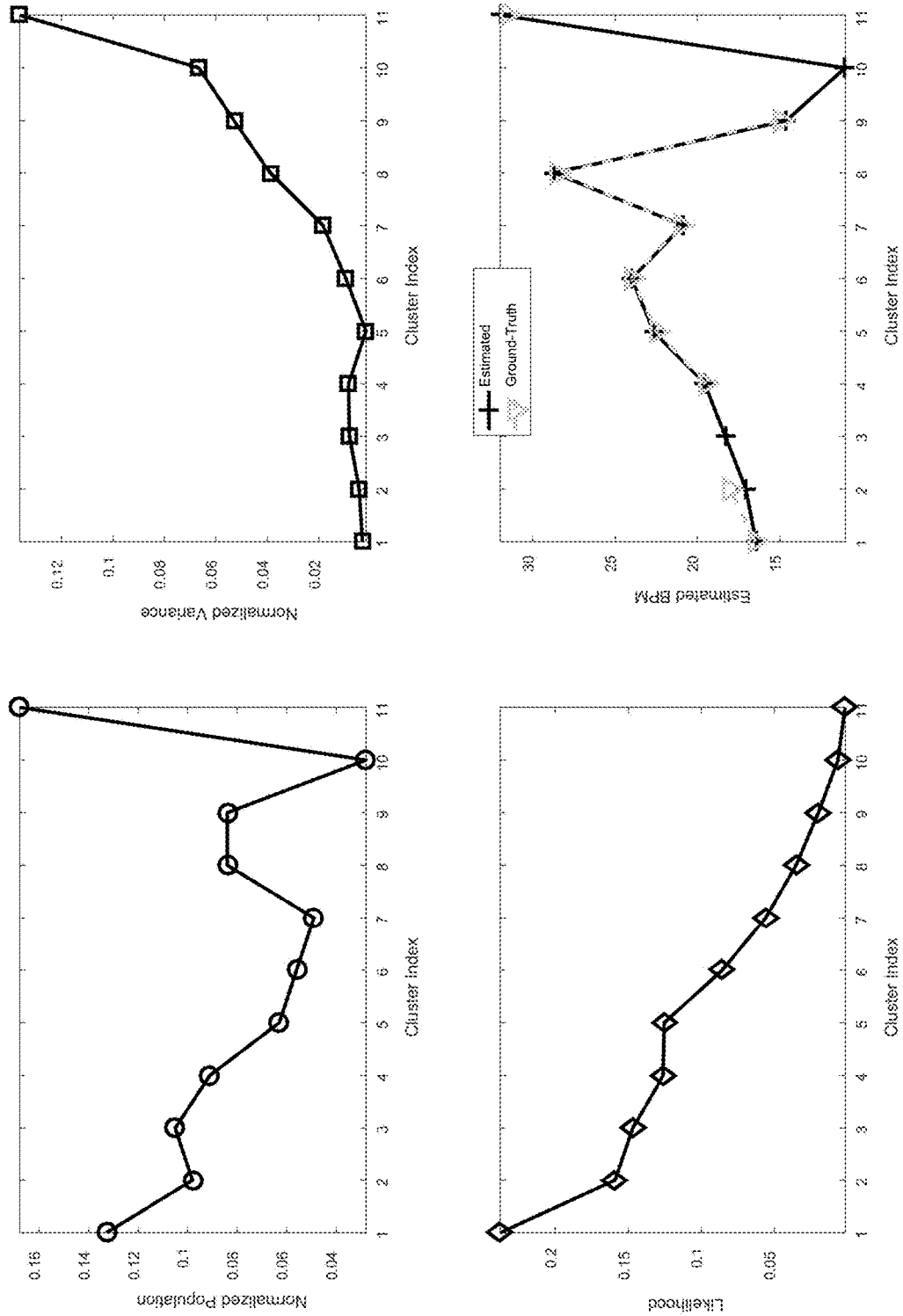
FIG. 13 shows results of an exemplary experiment for breathing monitoring under an exemplary experimental setting in a line-of-sight environment, according to an embodiment of the present teaching.

Then, one can evaluate the disclosed system for multi-person breathing monitoring in a LOS scenario. A total of 12 people are invited into the conference room as shown in FIG. 10 under the LOS scenario. The normalized population, variance, likelihood, and centroid for each cluster are presented in FIG. 13. It can be seen from FIG. 13 that the proposed system resolves the breathing rates of 9 out of a dozen people with an accuracy of 98.65%.

Figure 11:
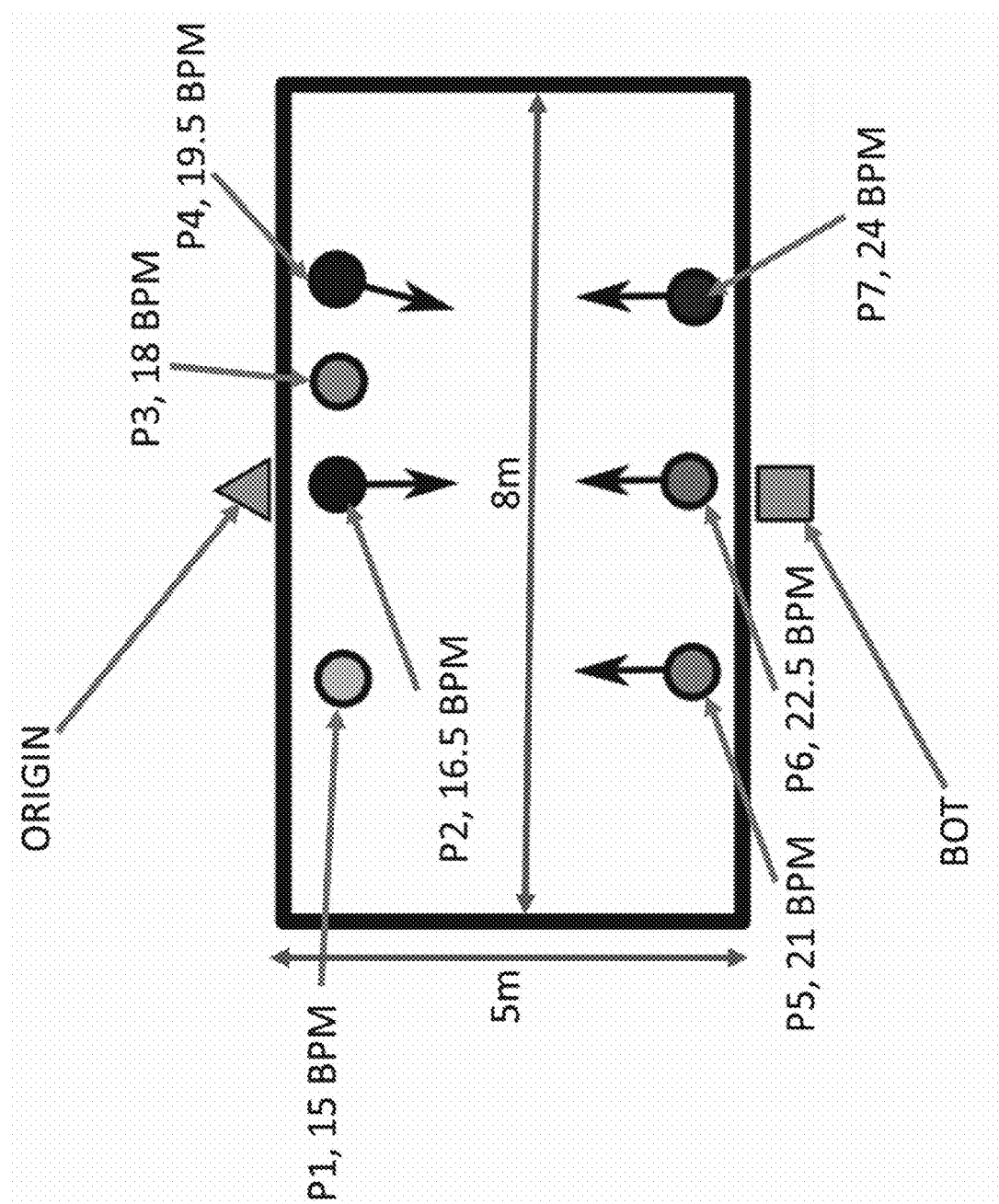
FIG. 11 shows an exemplary experimental setting for multi-person breathing monitoring under a non-line-of-sight scenario, according to an embodiment of the present teaching.
Figure 14:
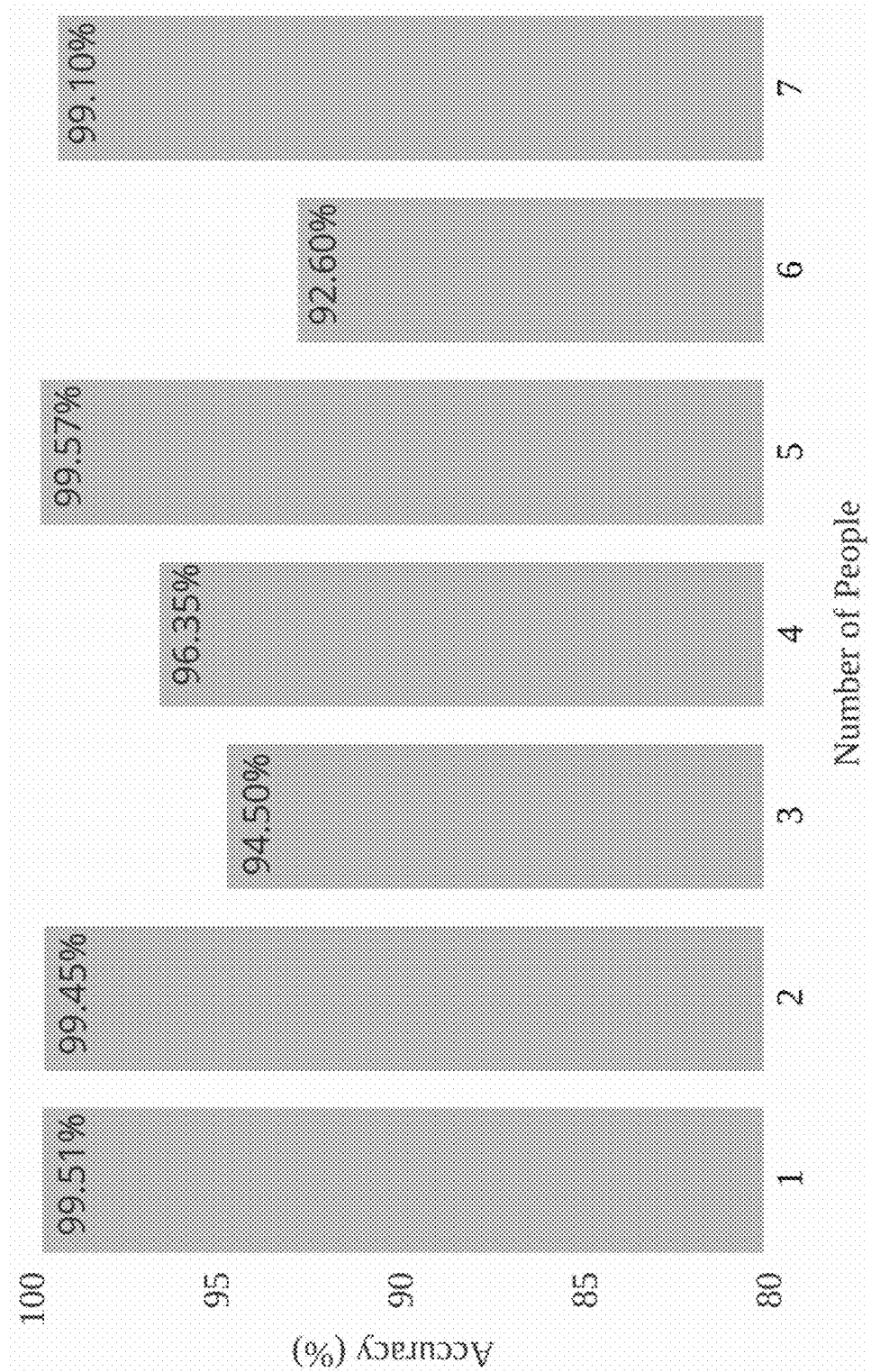
FIG. 14 shows accuracy performance of an exemplary experiment for breathing monitoring under an exemplary experimental setting in a non-line-of-sight environment, according to an embodiment of the present teaching.

The disclosed system was further evaluated under multi-person NLOS scenario. Different number of people (up to 7 people) were invited into one conference room with two devices placed under the NLOS scenario as shown in FIG. 11. The accuracy performances are shown in FIG. 14, indicating that an accuracy of 99.1% can be achieved when K=7 and a mean accuracy of 97.3% averaging over all 7 cases.

Figure 15:
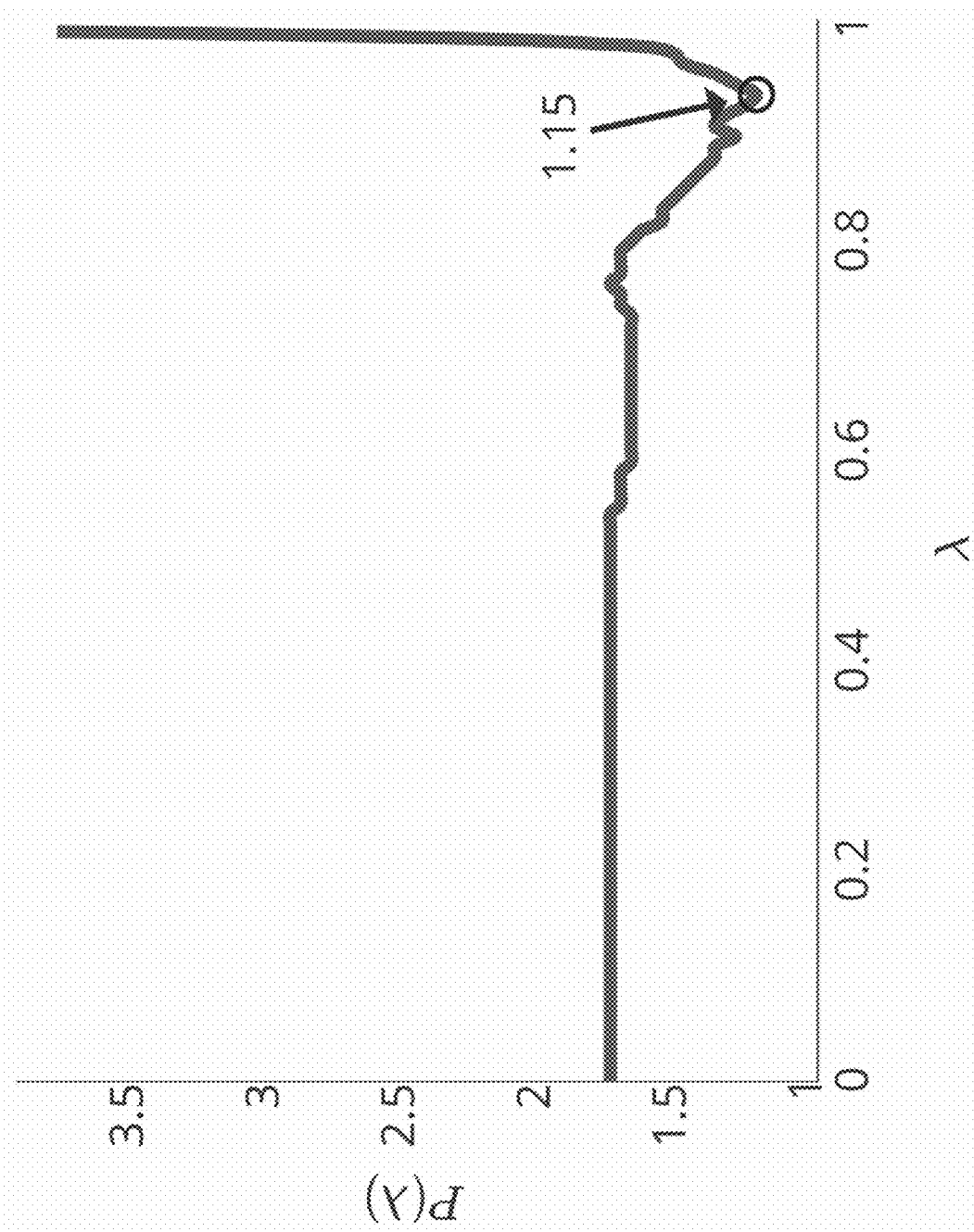
FIG. 15 shows performance of an exemplary experiment about people counting based on breathing, according to an embodiment of the present teaching.

FIG. 15 demonstrates the performance of people counting of the disclosed system. The mean error of people counting was assessed as P(λ) as a function of the threshold λ. One can observe that the optimal P(λ) is 1.15 when λ=0.88. Thus, the proposed system can estimate the number of people with an error around 1.

Then, the performance of the disclosed system was studied in the presence of packet loss due to ambient Wi-Fi traffic incurred by co-existing Wi-Fi systems. One can consider two different packet loss mechanisms, i.e., bursty packet loss and random packet loss. The bursty packet loss may be mainly caused by the continuous data transmission among few Wi-Fi devices which fully jams the medium for a long time. On the other hand, the random packet loss may be due to the random access of a large number of nearby WiFi devices which occupy the medium occasionally.

Figure 16:
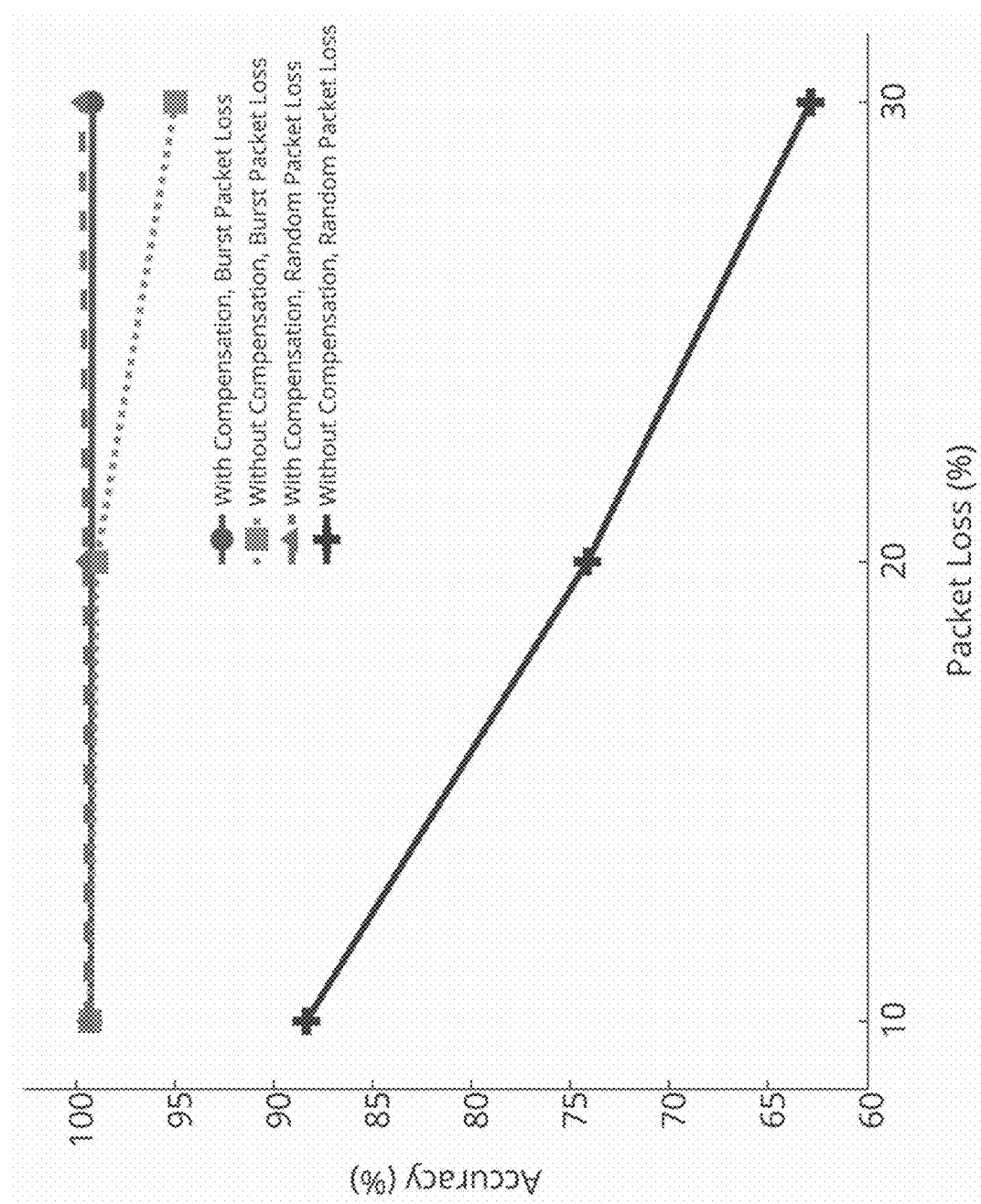
FIG. 16 shows accuracy performance of an exemplary experiment in the presence of packet loss with and without compensation, according to an embodiment of the present teaching.

The results with different packet loss rate with the aforementioned two mechanisms are shown in FIG. 16. One can observe that the consequence of random packet loss is much more severe than the bursty packet loss when the packet loss compensation is not enabled. With 10% random packet loss, the accuracy drops to 88.35% from 99.35%. The accuracy further deteriorates to 74.13% and 62.83% with 20% and 30% packet loss, respectively. The advantage of packet loss compensation is obvious, as the disclosed system maintains an accuracy of 99.70% even with 30% packet loss. On the contrary, bursty packet loss does not degrade the accuracy greatly. It can be justified by the fact that most CSIs are still sampled uniformly under this scenario.

Figure 17:
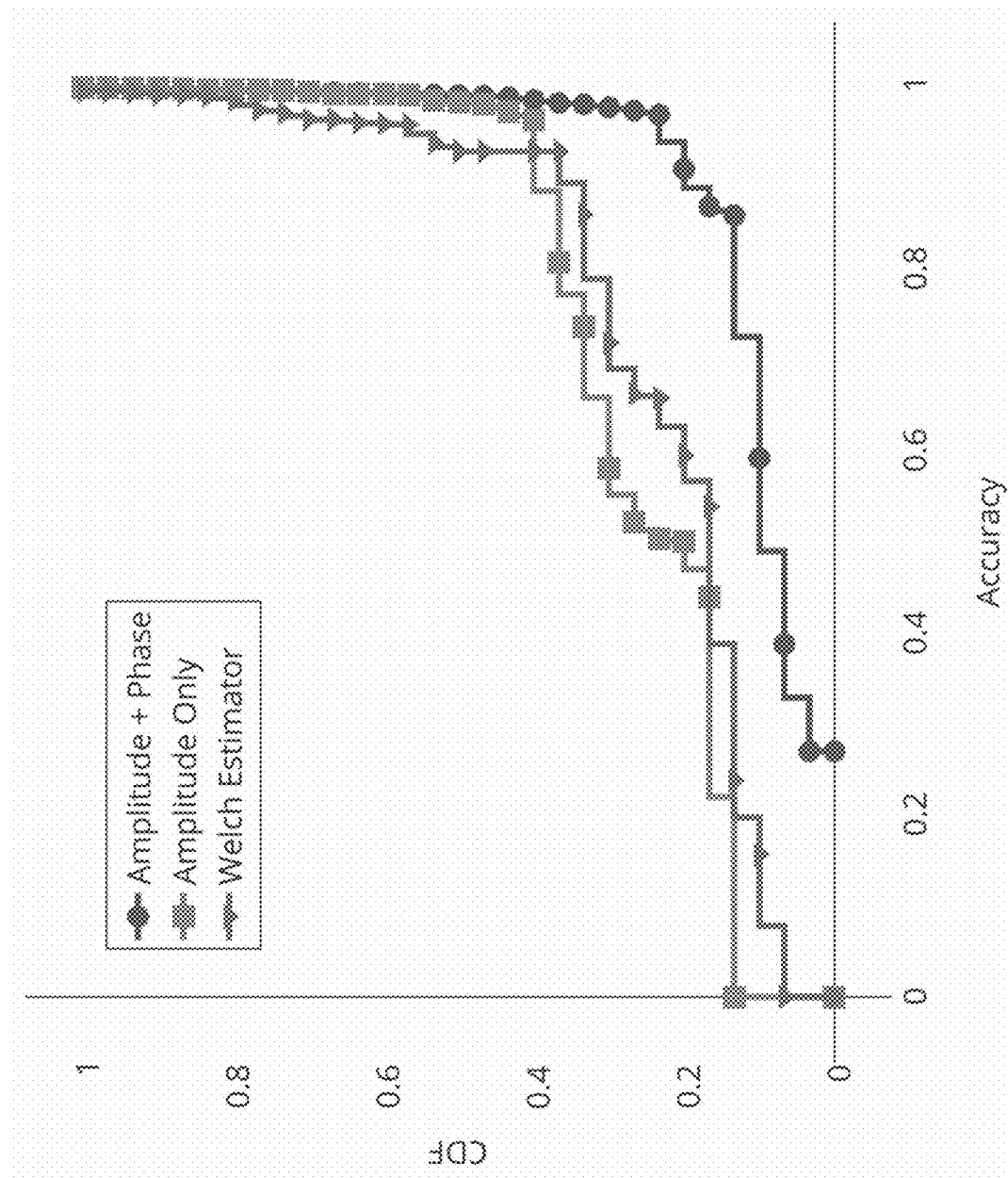
FIG. 17 shows cumulative density functions of accuracy performance of an exemplary experiment using different schemes, according to an embodiment of the present teaching.

FIG. 17 shows cumulative density function performances of multi-person NLOS scenario with various schemes. As shown in FIG. 17, using both the amplitude and phase of CSIs outperform the case which uses CSI amplitude alone. Meanwhile, one can also conclude that using the Root-MUSIC scheme outperforms conventional non-parametric schemes, for example, the Welch's estimator.

To implement various modules, units, and their functionalities described in the present disclosure, computer hardware platforms may be used as the hardware platform(s) for one or more of the elements described herein (e.g., the components of the system described with respect to any of FIGS. 1-17). The hardware elements, operating systems and programming languages of such computers are conventional in nature, and it is presumed that those skilled in the art are adequately familiar therewith to adapt those technologies to explore vital sign detection and monitoring based on channel state information as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

The disclosed system can be realized by a specialized system having a functional block diagram illustration of a hardware platform which includes user interface elements. The computer may be a general purpose computer or a special purpose computer. Both can be used to implement a specialized system for the present teaching. This computer may be used to implement any component of the techniques of vital sign detection and monitoring based on channel state information, as described herein. For example, the system in FIG. 8 may be implemented on a computer, via its hardware, software program, firmware, or a combination thereof.

Hence, aspects of the methods of vital sign detection and monitoring based on channel state information, as outlined above, may be embodied in programming Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the vital sign detection and monitoring based on channel state information as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. An apparatus for vital sign detection, comprising:
a receiver configured for receiving at least one wireless signal from a multipath channel that can be impacted by one or more vital signs of one or more living beings;
a processor; and
a memory communicatively coupled with the processor, wherein the processor is configured for:
extracting at least one time series of channel information (TSCI) of the multipath channel from the at least one wireless signal,
computing a similarity matrix based on the at least one TSCI, each matrix element being a measure of similarity between two channel information (CI) of the at least one TSCI,
obtaining one or more periodic fluctuations based on a spectral analysis of the at least one TSCI based on the similarity matrix,
performing a decomposition of the similarity matrix,
generating a spectrum based on the decomposition of the similarity matrix,
detecting one or more extrema of the spectrum,
determining rates of the one or more periodic fluctuations based on the one or more detected extrema, and
determining whether the one or more vital signs are present based on at least one of: the one or more periodic fluctuations, the rates, or the detected extrema.

2. The apparatus of claim 1, wherein at least one of:
a vital sign comprises at least one of: breathing, heartbeat, and another vital sign having a periodic pattern;
the processor is further configured for determining one or more vital sign analytics of the one or more living beings, upon determining the one or more vital signs are present;
the spectral analysis is performed based on at least one of: a MUSIC based algorithm, a Root-MUSIC based algorithm, a parametric scheme, a non-parametric scheme, machine learning, and another spectral analysis algorithm.

3. The apparatus of claim 1, wherein:
the processor is further configured for:
cleaning the at least one TSCI by subtracting background information from the CI,
normalizing the at least one TSCI, and
calculating at least one measure of similarity each based on a pair of CI among the at least one TSCI, wherein the spectral analysis is performed based on the at least one measure of similarity; and
a measure of similarity of a pair of CI is calculated based on at least one of: a time-reversal resonance strength (TRRS), a cross-correlation, an inner product of two vectors, a similarity score, a distance score, a phase correction, a timing correction, a timing compensation, and a phase offset compensation, of the pair of CI.

4. The apparatus of claim 1, wherein at least one of:
the processor is further configured for:
smoothing the similarity matrix in time domain to generate a smoothed similarity matrix, wherein the spectral analysis is performed based on the smoothed similarity matrix;
the processor is further configured for:
computing a TRRS matrix based on the at least one TSCI,
performing an eigenvalue decomposition on the TRRS matrix,
obtaining a noise subspace based on the eigenvalue decomposition,
generating a pseudo-spectrum based on the noise subspace,
performing spectrum folding on the pseudo-spectrum to generated an updated pseudo-spectrum,
trimming the updated pseudo-spectrum into a range related to vital sign rate, and
detecting one or more peaks of the updated pseudo-spectrum within the range,
wherein one or more vital sign rates of the one or more vital signs of the one or more living beings are determined based on the one or more peaks; and
the processor is further configured to:
computing a TRRS matrix based on the at least one TSCI,
performing an eigenvalue decomposition on the TRIS matrix,
obtaining a noise subspace based on the eigenvalue decomposition,
obtaining a matrix based on the noise subspace,
generating a polynomial equation based on the obtained matrix, and
selecting one or more complex roots of the polynomial equation,
wherein the one or more vital sign rates of the one or more vital signs of the one or more living beings are determined based on an information related to at least one of: angle and phase, of the one or more complex roots.

5. The apparatus of claim 1, wherein at least one of:
one or more vital sign rates of the one or more vital signs of the one or more living beings are determined by:
determining vital sign rate estimations based on the spectral analysis of the at least one TSCI,
partitioning the vital sign rate estimations into a plurality of clusters each with an associated likelihood which indicates a possibility for that cluster to represent a vital sign rate,
merging two clusters in the plurality of clusters into one cluster when a centroid distance between the two clusters is less than a threshold,
recalculating the vital sign rate estimation and its associated likelihood for each merged cluster, and
determining the one or more vital sign rates based on one or more clusters having the highest associated likelihoods among the clusters after merging;
the processor is further configured for estimating a quantity of the one or more living beings based on a number of clusters of vital sign rate estimations; and
the processor is further configured for monitoring the one or more vital sign rates of the one or more vital signs of the one or more living beings continuously as they perform at least one of doing exercises, working, sleeping, eating, drinking, standing, sitting, walking, running, and any other activities.

6. The apparatus of claim 1, wherein:
the at least one wireless signal is received through a network that is at least one of:
Internet, an Internet-protocol network, and another multiple access network;

the receiver is associated with a physical layer of at least one of: a wireless PAN, IEEE 802.15.1 (Bluetooth), a wireless LAN, IEEE 802.11 (Wi-Fi), a wireless MAN, IEEE 802.16 (WiMax), WiBro, HiperMAN, mobile WAN, GSM, GPRS, EDGE, HSCSD, iDEN, D-AMPS, IS-95, PDC, CSD, PHS, WiDEN, CDMA2000, UMTS, 3GSM, CDMA, TDMA, FDMA, W- CDMA, HSDPA, W-CDMA, FOMA, 1×EV-DO, IS-856, TD-SCDMA, GAN, UMA, HSUPA, LTE, 2.5G, 3G, 3.5G, 3.9G, 4G, 5G, 6G, 7G, another wireless system and another mobile system.

7. A method, implemented on a machine including at least a receiver, a processor and a memory communicatively coupled with the processor for vital sign detection, comprising:
receiving at least one wireless signal from a multipath channel that can be impacted by at least one vital sign each associated with a respective living being of one or more living beings;
extracting at least one time series of channel information (TSCI) of the multipath channel from the at least one wireless signal;
calculating a similarity matrix based on the at least one TSCI, each entry of the similarity matrix being a similarity score between two channel information CI of the at least one TSCI;
obtaining one or more periodic fluctuations based on a spectral analysis of the at least one TSCI based on the similarity matrix;
performing a decomposition on the similarity matrix;
generating a spectrum based on the decomposition of the similarity matrix;
performing spectrum folding on the spectrum;
detecting one or more peaks of the spectrum;
determining frequency of the one or more periodic fluctuations based on the one or more peaks; and
determining whether the at least one vital sign is present based on at least one of: the one or more periodic fluctuations, the frequency, or the one or more peaks.

8. The method of claim 7, wherein a vital sign comprises at least one of:
breathing, heartbeat or another vital sign having a periodic pattern, and the method further comprises determining one or more analytics of the at least one vital sign of the one or more living beings, upon determining the at least one vital sign is present.

9. The method of claim 7, further comprising:
cleaning each TSCI by subtracting background information from the CI;
normalizing each TSCI; and
calculating a degree of similarity based on each of a plurality of pairs of CI among the at least one TSCI, wherein the spectral analysis is performed based on the calculated degrees of similarity, and the degree of similarity of a pair of CI is calculated based on at least one of: a TRRS, a cross-correlation, an inner product of two vectors, a similarity score, a distance score, a phase correction, a timing correction, a timing compensation, and a phase offset compensation, of the pair of CI.

10. The method of claim 7, further comprising:
smoothing the similarity matrix in time domain to generate a smoothed similarity matrix.

11. The method of claim 7, further comprising:
generating an updated pseudo-spectrum based on the spectrum folding;
trimming the updated pseudo-spectrum into a range related to vital sign rate; and
detecting one or more updated peaks of the updated pseudo-spectrum within the range.

12. The method of claim 7, further comprising:
obtaining a noise subspace based on the decomposition;
obtaining a matrix based on the noise subspace;
generating a polynomial equation based on the obtained matrix; and
selecting one or more complex roots of the polynomial equation,
wherein one or more vital sign rates of the one or more living beings are determined based on an information related to at least one of angle and phase of the one or more complex roots.

13. The method of claim 7, wherein the spectral analysis is performed based on at least one of a MUSIC based algorithm, a Root-MUSIC based algorithm, a parametric scheme, a non-parametric scheme, machine learning, and another spectral analysis algorithm.

14. The method of claim 8, wherein determining the one or more analytics of the at least one vital sign of the one or more living beings comprises:
determining vital sign rate estimations based on the spectral analysis of the at least one TSCI;
partitioning the vital sign rate estimations into a plurality of clusters each with an associated likelihood which indicates a possibility for that cluster to represent a vital sign rate;
merging two clusters in the plurality of clusters into one cluster when a centroid distance between the two clusters is less than a threshold;
recalculating the vital sign rate estimation and its associated likelihood for each merged cluster; and
determining one or more vital sign rates of the one or more living beings based on one or more clusters having the highest associated likelihoods among the clusters after merging.

15. The method of claim 14, further comprising estimating a quantity of the one or more living beings based on the number of clusters after merging.

16. The method of claim 14, further comprising monitoring the one or more vital sign rates of the one or more living beings continuously as they perform at least one of doing exercises, working, sleeping, eating, drinking, standing, sitting, walking, running, and any other activities.

17. The method of claim 7, wherein:
the at least one wireless signal is received through a network that is at least one of:
Internet, an Internet-protocol network, and another multiple access network;
the receiver is associated with a physical layer of at least one of: a wireless PAN, IEEE 802.15.1 (Bluetooth), a wireless LAN, IEEE 802.11 (Wi-Fi), a wireless MAN, IEEE 802.16 (WiMax), WiBro, HiperMAN, mobile WAN, GSM, GPRS, EDGE, HSCSD, iDEN, D-AMPS, IS-95, PDC, CSD, PHS, WiDEN, CDMA2000, UMTS, 3GSM, CDMA, TDMA, FDMA, W- CDMA, HSDPA, W-CDMA, FOMA, 1×EV-DO, IS-856, TD-SCDMA, GAN, UMA, HSUPA, LTE, 2.5G, 3G, 3.5G, 3.9G, 4G, 5G, 6G, 7G, another wireless system and another mobile system.

18. An apparatus for vital sign detection, comprising:
a plurality of receivers each of which is configured for receiving at least one wireless signal from a multipath channel that can be impacted by at least one vital sign of one or more living beings;

a processor; and a memory communicatively coupled with the processor, wherein the processor is configured for:

for each of the plurality of receivers:

extracting at least one time series of channel information (TSCI) of the multipath channel from the at least one wireless signal, computing a similarity matrix based on the at least one TSCI, each entry of the similarity matrix being a degree of similarity between two channel information (CI) of the at least one TSCI, obtaining one or more periodic fluctuations based on a spectral analysis of the at least one TSCI based on the similarity matrix, generating a spectrum based on the similarity matrix, detecting one or more local maxima of the spectrum, detecting presence of the one or more periodic fluctuations based on the detected one or more local maxima, and determining one or more vital sign candidates based on at least one of: the one or more detected local maxima, or the one or more detected periodic fluctuations, combining the vital sign candidates associated with the plurality of receivers to generate a set of combined vital sign candidates, and determining whether the at least one vital sign is present based on the set of combined vital sign candidates.

19. The apparatus of claim 18, wherein:

at least one CI is missing in the at least one TSCI;

the processor is further configured for projecting at least one CI in the at least one TSCI into two or more distinct path delays of the multipath channel;

the processor is further configured for extracting at least one of high-order harmonics of the one or more periodic fluctuations based on the spectral analysis of the at least one TSCI; and the one or more vital sign candidates are determined based on the at least one of the high-order harmonics.

20. The apparatus of claim 18, wherein the processor is further configured for:

determining, for each of the plurality of receivers, one or more vital sign rate candidates based on at least one of: the one or more periodic fluctuations and the one or more detected local maxima of the spectrum;

combining the vital sign rate candidates associated with the plurality of receivers to generate a set of combined vital sign rate candidates;

partitioning the combined vital sign rate candidates into a plurality of clusters each with an associated likelihood that indicates a possibility for that cluster to represent a vital sign rate;

merging two clusters in the plurality of clusters into one cluster when a centroid distance between the two clusters is less than a threshold;

recalculating an estimated vital sign rate and its associated likelihood for each merged cluster; and determining one or more vital sign rates of the one or more living beings based on one or more clusters having the highest associated likelihoods among the clusters after merging, wherein the processor is further optionally configured for estimating a quantity of the one or more living beings based on the number of dusters after merging.

* * * * *